(12) United States Patent
Tamir

(10) Patent No.: US 11,465,326 B2
(45) Date of Patent: Oct. 11, 2022

(54) PLASTIC COMPOSITION

(71) Applicant: UBQ Materials Ltd., Petah-Tikva (IL)

(72) Inventor: Yuval Tamir, Moshav Avichail (IL)

(73) Assignee: UBQ Materials Ltd., Petah-Tikva (IL)

( * ) Notice: Subject to any disclaimer, the term of this patent is extended or adjusted under 35 U.S.C. 154(b) by 663 days.

(21) Appl. No.: 15/970,678

(22) Filed: May 3, 2018

(65) Prior Publication Data

US 2018/0319066 A1    Nov. 8, 2018

(51) Int. Cl.
| | |
|---|---|
| B29C 48/40 | (2019.01) |
| B29C 35/02 | (2006.01) |
| B09B 3/20 | (2022.01) |
| B29C 48/41 | (2019.01) |
| B29C 48/405 | (2019.01) |
| B29B 17/00 | (2006.01) |
| B29C 48/16 | (2019.01) |
| B29C 48/275 | (2019.01) |
| B29K 27/06 | (2006.01) |
| B29K 67/00 | (2006.01) |
| B29L 31/00 | (2006.01) |

(52) U.S. Cl.
CPC .............. B29C 48/277 (2019.02); B09B 3/20 (2022.01); B29B 17/0026 (2013.01); B29C 35/02 (2013.01); B29C 48/16 (2019.02); B29C 48/405 (2019.02); B29C 48/41 (2019.02); B29C 48/40 (2019.02); B29K 2027/06 (2013.01); B29K 2067/00 (2013.01); B29L 2031/7722 (2013.01); Y02W 30/62 (2015.05)

(58) Field of Classification Search
CPC ....... B29C 48/277; B29C 48/16; B29C 48/40; B29C 35/02; B29C 48/41; B29C 48/405; B09B 3/0025; B09B 3/20; B29B 17/0026; B29L 2031/7722; B29K 2067/00; B29K 2027/06; Y02W 30/62
USPC .......................................... 523/129; 264/319
See application file for complete search history.

(56) References Cited

U.S. PATENT DOCUMENTS

| | | | |
|---|---|---|---|
| 3,846,366 A | 11/1974 | Wallace | |
| 3,850,771 A | 11/1974 | Penque | |
| 4,013,616 A | 3/1977 | Wallace | |
| 4,225,640 A | 9/1980 | Erb | |

(Continued)

FOREIGN PATENT DOCUMENTS

| | | |
|---|---|---|
| CA | 2366430 A1 | 7/2003 |
| CN | 1329949 A | 1/2002 |

(Continued)

OTHER PUBLICATIONS

Gidarakos et al., "Municipal solid waste composition determination supporting the integrated solid waste management system in the island of Crete", Waste Management, 2006, vol. 26, p. 668-679 (Year: 2006).

(Continued)

*Primary Examiner* — David T Karst
(74) *Attorney, Agent, or Firm* — Greenberg Traurig, LLP

(57) ABSTRACT

A plastic composition consisting essentially of plastic matter, inorganic matter, and organic matter. The plastic composition has a notched izod impact above 12 J/m, a surface energy of at least 40 dyne/cm and, and when the plastic composition is subjected to injection molding, at least one of a tensile strength of above about 2.7 MPa, a tensile modulus of above about 600 MPa, a flexural modulus above about 690 MPa, a flexural strength above about 5.6 MPa, and a Charpy Impact above about 1.5 KJ/m2.

8 Claims, 13 Drawing Sheets

(56) References Cited

U.S. PATENT DOCUMENTS

| | | | |
|---|---|---|---|
| 4,772,430 A | 9/1988 | Sauda et al. |
| 4,968,463 A | 11/1990 | Levasseur |
| 5,217,655 A | 6/1993 | Schmidt |
| 5,376,156 A | 12/1994 | Schraufstetter et al. |
| 5,750,125 A | 5/1998 | Lahanas et al. |
| 5,844,008 A | 12/1998 | McMillian |
| 5,948,524 A | 9/1999 | Seethamraju et al. |
| 5,973,035 A | 10/1999 | Medoff et al. |
| 6,017,475 A | 1/2000 | Cantrell |
| 6,243,254 B1 | 6/2001 | Wada et al. |
| 6,253,527 B1 | 7/2001 | De Zen |
| 6,692,544 B1 | 2/2004 | Grillenzoni |
| 7,022,751 B2 | 4/2006 | Zhang et al. |
| 9,914,256 B2 | 3/2018 | Tamir |
| 2003/0018605 A1 | 10/2003 | Crews et al. |
| 2004/0080072 A1 | 4/2004 | Bouldin et al. |
| 2004/0169306 A1 | 9/2004 | Crews et al. |
| 2004/0202857 A1 | 10/2004 | Singer |
| 2006/0091578 A1 | 5/2006 | Bravo et al. |
| 2007/0149625 A1 | 6/2007 | Lark et al. |
| 2007/0272775 A1 | 11/2007 | Szilvassy et al. |
| 2011/0272858 A1 | 11/2011 | Tamir |
| 2016/0075072 A1 | 3/2016 | Tamir |

FOREIGN PATENT DOCUMENTS

| | | |
|---|---|---|
| CN | 1537131 A | 10/2004 |
| JP | S4943463 A | 4/1974 |
| JP | S5174977 A | 6/1976 |
| JP | H04507429 A | 12/1992 |
| JP | H05277460 A | 10/1993 |
| JP | H0671647 A | 3/1994 |
| JP | H07501277 A | 2/1995 |
| JP | H09183121 A | 7/1997 |
| JP | H1142641 A | 2/1999 |
| JP | H11514000 A | 12/1999 |
| JP | 2001070909 A | 3/2001 |
| JP | 2001287210 A | 10/2001 |
| JP | 2000503694 A | 3/2003 |
| JP | 2003138282 A | 5/2003 |
| JP | 2005538862 A | 12/2005 |
| JP | 2008296569 A | 12/2008 |
| JP | 2012515080 A | 7/2012 |
| KR | 20030014929 A | 2/2003 |
| WO | 94/11176 A1 | 5/1994 |
| WO | 9602373 A1 | 2/1996 |
| WO | 9942230 A | 8/1999 |
| WO | 2004043097 A | 5/2004 |
| WO | 2005092708 A | 10/2005 |
| WO | 2006035441 A | 4/2006 |
| WO | 2006079842 A | 8/2006 |

OTHER PUBLICATIONS

International Search Report from International Appln. No. PCT/IL2010/000042 dated Jul. 22, 2010.

Nam et al., "Extrusion of Municipal Plastic Waste and Rice Husk to Produce Solid Fuel," ICENP (2008).

PLASTIC COMPOSITION

FIELD OF THE INVENTION

The invention disclosed herein relates to waste treatment, particularly, domestic or municipal waste and more particularly to methods for transforming substantially unsorted waste into useful products as well as such products.

BACKGROUND OF THE INVENTION

There is a growing awareness and recognition of the importance of recycling, nevertheless, only a fraction of the generated municipal waste is actually recycled. It has been reported by the United States Environmental Protection Agency that in 2007, Americans generated 254 million tons of municipal waste. Of this only 63 million tons was recycled, 22 million tons composted, and 32 million tons was combusted to produce energy. That means that 137 million tons were simply discarded, mostly to landfills.

Economics is the primary reason for the limited amount of waste that is recycled. Simply speaking, if recycling does not generate a profit it is not done. The significant costs involved in recycling are sorting, transportation and the energy used in the sorting and transportation processes.

Various technologies have been developed over the years aimed at providing low cost useful products from municipal wastes.

U.S. Pat. No. 3,850,771 provides a process for processing waste wherein a portion of cellulose from the waste is separated (sorted) from the bulk of the waste and transformed into cellulose xanthate. The cellulose xanthate, being soluble, is uniformly distributed back into the waste and upon conversion back to the cellulose form, it binds the waste components. It is taught that the cellulose in the waste is essentially useless and may in fact be objectionable. These are the reasons that the patent teaches to remove a portion from the waste, convert it, and then remix it with the waste, and upon further treatment, the cellulose precipitates to form a binder.

U.S. Pat. No. 4,013,616 describes a method of using comminuted municipal or industrial waste as a filler for thermosetting or thermoplastic resins such as polyethylene and using the filled resin to make a useful product. The process requires a presorting of the waste into light and heavy fractions. Moreover, the patent teaches that the plastics in the original waste are not suitable as binding agents. The components making up a typical municipal waste are set forth in Table 1 of the patent.

U.S. Pat. No. 4,772,430 describes a process for compacting solid waste containing at least 10% by weight thermoplastic materials using an extrusion molder to obtain high-density rod-like masses or pellets. The rod-like masses or pellets consist of non-homogenous aggregates of miscellaneous waste materials and because of the process conditions, the plastic is concentrated at the peripheral portion of the composite to form a plastic solidified layer, like a crust.

U.S. Pat. No. 4,968,463 describes a method focusing on disposing of plastic waste wherein it is important that the thermoplastic content be over 65% by weight and the water content be less than 3% wherein optionally adding filler (which can also be a waste) and coloring materials. The product is characterized by having a bending rupture stress (flexural strength) of 35-50 N/mm$^2$ and is processable with machine tools used for wood.

U.S. Pat. No. 5,217,655 describes a composite product obtained by first granulating a mixture of plastic and fibrous material, e.g. a commercial, municipal or industrial waste from which, preferably, metal has been removed, and then heating the mixture in stages from about 100-204° C. while continuously mixing in an extruder. The composite material may contain at least 50% thermoplastic material and is described as having high impact properties, high compression strength, may be coated with coloring agents and may be used for industrial posts, beams and construction columns.

U.S. Pat. No. 6,017,475 describes a process utilizing a hydrolyzer for the complete hydrolysis of ligno-cellulose matter in waste. The process yields sterile cellulose pulp aggregates having traces of metals, plastics etc., macroscopically mixed in the aggregates. The aggregates are separable into pure cellulose pulp and a residual mixture containing inorganic pulp. The cellulose pulp and/or the residue may be further extruded, optionally with plastics or other additives to form useful products. Some products of the process are described in WO 2005/092708 and US2004/0080072.

U.S. Pat. No. 6,253,527 describes a method of compression molding of waste or filler particles that are bound together and encapsulated by a thermoplastic binder. The composite material is prepared by mixing particles of thermoplastic and waste or fillers; using high intensity mixing to frictionally heat the particles bringing the thermoplastic particles to a molten state where they coat and encapsulate the waste or filler particles. The molten mass is then compression molded.

U.S. Pat. No. 6,423,254 describes a method for manufacturing products from various types of waste materials comprising about 80% polyolefins and about 20% other thermoplastic polymers. The waste may be used in combination with raw materials such as wood, plastics, metals, heat-stabilizers and blowing agents.

KR 2003/0014929 describes a composite material obtained from waste from which metal was sorted out. The composite material comprises between 30-70% thermoplastics materials after sorting out metals, inter alia, because the metals cause problems in the grinding process.

WO 2006/079842 describes a method for processing clinical waste containing between 10% and 50% thermoplastic material, about 20% water, and the rest consisting of mainly cotton, adhesives, rubber and metal. The product is moldable and has a density of 200-500 Kg/m$^3$.

WO2006/035441 describes a method of encapsulating pieces of waste with melted plastic by heating and mixing.

SUMMARY OF THE INVENTION

The present invention is based on the surprising finding that subjecting substantially unsorted waste to shear forces at temperatures above 100° C. resulted in a composite material having thermoplastic properties.

Thus, the present invention provides a composite material having thermoplastic properties and comprising organic matter and optionally one or both of inorganic matter and plastic, having a surface energy above about 35 dyne/cm.

The present invention also provides a composite material having thermoplastic properties and comprising organic matter and optionally one or both of inorganic matter and plastic, having essentially no gaps between different components of the material when viewed at a magnification revealing structures above about 0.1 µm. Thus, in accordance with this embodiment particulate matter (e.g. small inorganic particles, fibers, solids particles of different origin etc.) are very closely associated with the surrounding medium such that gaps, if any, are of a size (width) of less than 0.1 µm. While not wishing to be bound by theory, this is believed to be a result of the adhesive properties of the new composite material that is comprised in said surrounding medium.

Also provided by the invention is a composite material having thermoplastic properties and comprising organic matter and optionally one or both of inorganic matter and plastic, said composite material has a phase transition from a solid to a flowable state at a temperature less than about 120° C., at times even less than about 110° C., less than about 100° C. and even at a temperature as low as about 90° C.

Also provided by the invention is a composite material having thermoplastic properties and comprising organic matter and optionally one or both of inorganic matter and plastic, characterized by one or more of the following:

- having a phase transition from a solid to a flowable state at a temperature less than about 120° C., at times even less than about 110° C., less than 100° C. and even at a temperature as low as 90° C.,
- having essentially no gaps between different components of the material when viewed at a magnification revealing structures above about 0.1 µm,
- having a surface energy above about 35 dyne/cm
- having a density above about 1.2 g/cm$^3$,
- having a potassium content above about 1 mg potassium per 1 gm of composite material (mg/g),
- having tensile strength of above about 4 MPa,
- having tensile modulus of above about 600 MPa,
- having flexural modulus above about 800 or even 1000 MPa,
- having flexural strength above about 7 MPa,
- having a notched Izod impact above about 12 J/m,
- having a Charpy impact of above about 1.5 KJ/m$^2$, 1.6 KJ/m$^2$, 1.7 KJ/m$^2$, or 1.8 KJ/m$^2$,
- releasing volatile compounds comprising one or more of butanone, acetic acid, butanoic acid, furfural, and phenol (these components induce a characteristic odor; the odor can be eliminated by the addition of odor absorbents); other volatiles, e.g. such typically released organic or non-organic waste may also be released from the composite material,
- comprising DNA,
- comprising chlorophyll.

In the following all indication of % relate to the relative amounts of components in w/w units, namely weight of a component in 100 units of weight of the composite material. The relative amount may be determined in the final product or may be determined in the starting material(s), used to produce the composite material, before processing (typically by heating under shear forces) or in samples taken during processing before obtaining the resulting final, composite material. As will be appreciated there may be some (typically small) variation between the relative amount of a component in the starting material before it is processed and the obtained composite material due to a loss of moisture, the formation of some volatile compounds during processing and other factors that should be taken into account when comparing the content of a component in the composite material and that in the starting material.

All amounts or measures indicated below with the term "about" followed by a number should be understood as signifying the indicated number with a possible tolerance between approximately 10% above the indicated number and 10% below that number. For example, the term "about 10%" should be understood as encompassing the range of 9% to 11%; the terms about 100° C. denotes a range of 90 to 110° C.

The composite material of the invention may comprise plastic in the range of between about 0 and about 40%, typically, however not exceeding about 35% or even about 30% of the composite material. The amount of plastic in some embodiments may be at least n %, n being any integer in the range of 1 to 20; in some embodiments the plastic material may be in an amount less than m %, m being an integer in the range of 15 to 29.

The composite material in some embodiments may comprise at least about 10% organic matter (other than synthetic polymeric material), typically at least about 15%, about 20%, about 25%, about 30%, about 35% or even about 40%; in some embodiments the composite material may comprise up to about 90%, typically less than about 85%, about 80%, about 75% or even less than about 70% of organic matter.

According to some embodiments the composite material comprises at least about 1%, about 2%, about 5%, about 10% or at least about 15% of inorganic matter; by some embodiments the composite material comprises less than about 50%, about 40%, about 30% or even less than about 20% of inorganic matter.

By some embodiments the composite material is prepared by extrusion.

By some embodiments the composite material is injection molded.

By some embodiments the composite material is prepared by rotational molding.

By some embodiments the composite material is compression molded.

By some embodiments the composite material is formed into granules.

The different preparation methods may be used to advantage for preparing composite materials of the invention with properties to suit specific needs or may be used for forming the composite material into different useful articles.

For further processing and production of articles said composite material in the form of granules or any other form may be mixed with other materials such as recycled or virgin plastics and then molded into useful articles. The plastic materials are typically polyolefins such as polyethylene or polypropylene, polyvinylchloride, unsorted plastic waste or mixtures thereof. In some embodiments said composite material may be mixed with a variety of different substances or materials non-limiting examples being minerals (e.g. calcium carbonate), salts, metal particles or pieces, organic or inorganic fibers, glass, carbon (e.g. active carbon), sand, ground rock, clay, gravel, and many others.

By some embodiments of the invention the composite material is prepared from unsorted or substantially unsorted waste (defined below), for example municipal, industrial or other waste. At times the waste may be used as is, as the raw material for preparing the composite material (by heating under shear forces). Also the waste may at times be subject to removal of some components, for example, metal or other inorganic material, to avoid abrasion by such components of the processing equipment, for example an extruder.

The present invention also provides a method of processing waste material. This method comprises: drying and optionally particulating substantially unsorted waste that comprises organic matter and optionally plastics to obtain dried and optionally particulate waste material; and heating while mixing the dry particulate waste material to a temperature of at least about 100° C., under shear forces. Thereby a composite material with thermoplastic properties is obtained.

The extent of the shear forces may influence the properties of the composite material. Shear forces may occur by mixing an industrial mixer or agitator, may occur within an extruder, and in many other instruments or machinery.

Said composite material may be used to prepare articles having a defined shape. The articles may be prepared by processing the composite material or a mixture comprising the composite material and other materials such as plastic or others exemplified below, at temperatures in the range of about 100° C. and about 240° C., or in the range of about 140 and about 230° C., or even in the range of about 180 to about 220° C., to assume the desired shape. Said composite material may optionally be particulated and sieved before heating. The articles may be obtained by extrusion of the composite material or the mixture comprising the composite material, followed by molding (injection molding, compression molding, rotational molding etc.) Thus, also forming part of the present invention are articles formed from the composite material having thermoplastic properties disclosed herein.

Accordingly, the invention also provides a method for preparing articles made from the composite material of this invention comprising, obtaining the composite material as described above, optionally grinding the composite material, optionally sieving the composite material, optionally mixing the composite material with other materials such as plastics and sand, heating and mixing the composite material or the mixture comprising the composite material under shear forces and molding the same into an article having a desired shape.

Finally, there is provided by the present invention a method for compacting waste, comprising: drying and optionally particulating substantially unsorted waste that comprises organic matter and optionally plastics to obtain dried and optionally particulate waste material; heating while mixing the dried waste material to a temperature in the range of about 100° C. and about 240° C., or in the range of about 140 and about 230° C., or even in the range of about 180 to about 220° C. under shear forces to obtain a resulting composite material; and forming the resulting composite material into blocks or other articles of a defined shape.

EMBODIMENTS

Some non-limiting embodiments encompassed by the present invention are defined in the following numbered clauses:

1. A composite material having thermoplastic properties and comprising organic matter and optionally one or both of inorganic matter and plastic, characterized by one or more of the following:
   having a phase transition from a solid to a flowable state at a temperature less than about 120° C.,
   having no gaps between different components of the material when viewed at a magnification revealing structures above 0.1 µm,
   having a surface energy above about 35 dyne/cm,
   having a density above about 1.2 g/cm$^3$,
   having a potassium content above about 1 mg potassium, per 1 gm of composite material (mg/g),
   having tensile strength of above about 4 MPa,
   having tensile modulus of above about 600 MPa,
   having flexural modulus above about 800 MPa,
   having flexural strength above about 7 MPa,
   having a notched Izod impact above about 12 J/m,
   having a Charpy impact of above about 1.5 KJ/m$^2$, 1.6 KJ/m$^2$, 1.7 KJ/m$^2$, or 1.8 KJ/m$^2$,
   releasing volatile compounds comprising one or more of butanone, acetic acid, butanoic acid, furfural, and phenol,
   comprising DNA,
   comprising chlorophyll.

2. The composite material of clause 1, comprising plastic material in the range of about 0-30%, organic material in the range of about 10-70%, and inorganic material in the range of about 0-70.

3. The composite material of numbered clause 1 or 2, comprising up to 40% plastic.

4. The composite material of numbered clause 3, comprising up to 35% plastic.

5. The composite material of numbered clause 4, comprising up to 30% plastic.

6. The composite material of any one of the previous numbered clauses, comprising plastic in the range of n % and m %, wherein n is any integer between 1 and 18 and m is any integer between 19 and 29.

7. The composite material of any one of the preceding numbered clauses, comprising organic material in the range of about 10% to about 90%.

8. The composite material of clause 7, comprising at least about 15% of organic matter.

9. The composite material of clause 8, comprising at least about 20% of organic matter.

10. The composite material of clause 9, comprising at least about 25% of organic matter.

11. The composite material of clause 10, comprising at least about 30% of organic matter.

12. The composite material of clause 11, comprising at least about 35% of organic matter.

13. The composite material of clause 12, comprising at least about 40% of organic matter.

14. The composite material of any one of clauses 7 to 13, comprising less than about 85% of organic matter.

15. The composite material of clause 14, comprising less than about 80% of organic matter.

16. The composite material of clause 15, comprising less than about 75% of organic matter.

17. The composite material of clause 16, comprising less than about 70% of organic matter.

18. The composite material of any one of the preceding numbered clauses, comprising inorganic matter in the range of 0% to about 50%.

19. The composite material of clause 18, comprising about 1% or more of inorganic matter.

20. The composite material of clause 19, comprising about 2% or more of inorganic matter.

21. The composite material of clause 20, comprising about 5% or more of inorganic matter.

22. The composite material of clause 21, comprising about 10% or more of inorganic matter.

23. The composite material of clause 22, comprising about 15% or more of inorganic matter.

24. The composite material of any of clauses 18-23, comprising less than about 50% of inorganic matter.

25. The composite material of clause 24, comprising less than about 40% of inorganic matter.

26. The composite material of clause 25, comprising less than about 30% of inorganic matter.

27. The composite material of clause 26, comprising less than about 20% of inorganic matter.

28. A composite material having thermoplastic properties and comprising organic matter and optionally one or both of inorganic matter and plastic and having a phase transition from a solid to a flowable state at a temperature of less than about 120° C.

29. The composite material of clause 28, wherein the phase transition is at a temperature of less than about 110° C.

30. The composite material of clause 29, wherein the phase transition is at a temperature of less than about 100° C.

31. The composite material of clause 30, wherein the phase transition is at a temperature in the range of about 90 to about 100° C.

32. The composite material of any one of clauses 28 to 31, having one or more of the features defined in clauses 1-26.

33. A composite material having thermoplastic properties and comprising organic matter and optionally one or both of inorganic matter and plastic and having essentially no gaps between different components of the material when viewed at a magnification revealing structures above about 0.1 μm.

34. A composite material having thermoplastic properties and comprising organic matter and optionally one or both of inorganic matter and plastic and comprising particles embedded in a matrix, the matrix being intimately associated with external surfaces of the particles essentially without gaps therebetween when viewed at a magnification revealing structures above 0.1 μm.

35. The composite material of clause 33 or 34, having one or more of the features defined in any one of clauses 1-32.

36. A composite material having thermoplastic properties and comprising organic matter and optionally one or both of inorganic matter and plastic and having a surface energy above about 35 dyne/cm.

37. The composite material of clause 36, having a surface energy above about 40 dyne/cm.

38. The composite material of clause 36 or 37, having one or more of the features defined in any one of clauses 1-31.

39. A composite material having thermoplastic properties and comprising organic matter and optionally one or both of inorganic matter and plastic and having a density above about 1.2 g/cm$^3$.

40. The composite material of clause 39, having a density in the range of about 1.2 and 1.7 g/cm$^3$.

41. The composite material of clause 39 or 40, having one or more of the features defined in any one of clauses 1-37.

42. A composite material having thermoplastic properties and comprising organic matter and optionally one or both of inorganic matter and plastic and having a potassium content above about 1 mg/g.

43. The composite material of clause 42, having one or more of the features defined in any one of clauses 1-40.

44. A composite material having thermoplastic properties and comprising organic matter and optionally one or both of inorganic matter and plastic and having tensile strength of above about 4 MPa.

45. The composite material of clause 44, having tensile strength of above about 5 MPa.

46. The composite material of clause 45, having tensile strength of above about 6 MPa.

47. The composite material of clause 46, having tensile strength of above about 7 MPa.

48. The composite material of clause 47, having tensile strength of above about 8 MPa.

49. The composite material of any one of numbered clauses 44 to 48, having one or more of the features defined in any one of clauses 1-42.

50. A composite material having thermoplastic properties and comprising organic matter and optionally one or both of inorganic matter and plastic and having tensile modulus of elasticity above about 600 MPa.

51. The composite material of clause 50, having one or more of the features defined in any one of clauses 1-48.

52. A composite material having thermoplastic properties and comprising organic matter and optionally one or both of inorganic matter and plastic and having flexural modulus above about 800 MPa.

53. The composite material of clause 52, wherein the flexural modulus is above about 1000 MPa.

54. The composite material of clause 53, wherein the flexural modulus is above about 2000 MPa.

55. The composite material of clause 54, wherein the flexural modulus is above about 3000 MPa.

56. The composite material of clause 55, wherein the flexural modulus is above about 3500 MPa.

57. The composite material of any one of numbered clauses 52 to 56, having one or more of the features defined in any one of clauses 1-50.

58. A composite material having thermoplastic properties and comprising organic matter and optionally one or both of inorganic matter and plastic and having flexural strength above about 7 MPa.

59. The composite material of clause 58, wherein the flexural strength is above about 9 MPa.

60. The composite material of clause 59, wherein the flexural strength is above about 11 MPa.

61. The composite material of any one of numbered clauses 58 to 60, having one or more of the features defined in any one of clauses 1-56.

62. As composite material having thermoplastic properties and comprising organic matter and optionally one or both of inorganic matter and plastic and having a notched Izod impact above about 12 J/m.

63. The composite material of clause 62, wherein the notched Izod impact is above about 13 J/m.

64. The composite material of clause 63, wherein the notched Izod impact is above about 15 J/m.

65. The composite material of clause 64, wherein the notched Izod impact is above about 17 J/m.

66. The composite material of any one of numbered clauses 62 to 65, having one or more of the features defined in any one of clauses 1-60.

67. A composite material having thermoplastic properties and comprising organic matter and optionally one or both of inorganic matter and plastic and having a Charpy impact of above about 1.5 KJ/m$^2$.

68. The composite material of clause 67, wherein the Charpy impact is above about 1.6 KJ/m$^2$.

69. The composite material of clause 68, wherein the Charpy impact is above about 1.7 KJ/m$^2$ 70. The composite material of clause 69, wherein the Charpy impact is above about 1.8 KJ/m$^2$.

71. The composite material of any one of numbered clauses 67 to 70, having one or more of the features defined in any one of clauses 1-65.

72. A composite material having thermoplastic properties and comprising organic matter and optionally one or both of inorganic matter and plastic and releasing volatile compounds comprising one or more of butanone, acetic acid, butanoic acid, furfural, and phenol.

73. A composite material having thermoplastic properties and comprising organic matter and optionally one or both of inorganic matter and plastic and comprising DNA.

74. The composite material of clause 72 or 73, having one or more of the features defined in any one of numbered clauses 1-70.

75. The composite material of any one of the preceding numbered clauses, prepared by extrusion.

76. The composite material of any one of the preceding numbered clauses, being compression or injection molded.

77. The composite material of any one of the preceding numbered clauses, prepared from substantially unsorted waste.

78. The composite material of clause 77, prepared from substantially unsorted waste which is devoid of some inorganic material included in unsorted waste.

79. The composite material of clause 78, prepared from substantially unsorted waste which is devoid of some metal included in unsorted waste.

80. A method of processing waste material, comprising:
   drying and optionally particulating substantially unsorted waste that comprises organic matter and optionally plastics to obtain dried and optionally particulate waste material; and
   heating while mixing the dry particulate waste material to a temperature of at least about 100° C. under shear forces to thereby obtain a composite material with thermoplastic properties.

80A. A method for preparing a composite material, comprising:
   obtaining a mixture comprising organic matter and optionally plastics; and
   heating the mixture to a temperature of at least about 100° C. under shear forces to thereby obtain a composite material with thermoplastic properties 81. The method of clause 80 or 80A, further comprising participating said composite material.

82. The method of clause 80-81, wherein the temperature is at least 120° C.

83. The method of clause 82, wherein the temperature is at least 140° C.

84. The method of clause 83, wherein the temperature is at least 160° C.

85. The method of clause 84, wherein the temperature is in the range of 180° C. to 220° C.

86. The method of any one of clauses 80-85, for manufacture of a composite material as defined in any one of the numbered clauses 1-79.

87. Articles formed from the composite material as defined in any one of clauses 1-79 or a composite material prepared in a manner as defined in clauses 80-86.

88. A method for manufacturing an article comprising:
   drying and optionally peculating substantially unsorted waste that comprises organic matter and optionally plastics to obtain dried and optionally particulate waste material;
   heating while mixing the dried waste material to a temperature in the range of about 100° C. and about 240° C. under shear forces to obtain a composite material;
   molding the composite material to form the article.

89. A method for compacting waste, comprising:
   drying and optionally particulating substantially unsorted waste that comprises organic matter and optionally plastics to obtain dried and optionally particulate waste material;
   heating while mixing the dried waste material to a temperature in the range of about 100° C. and about 240° C. under shear forces to obtain a composite material; and
   forming the resulting composite material into blocks or other articles of a defined shape.

90. The method of clauses 88 or 89, wherein the temperature is in the range of about 140 and about 230° C.

91. The method of clause 90, wherein the temperature is in the range of about 180 and about 220° C.

92. The method of any one of clauses 80-91, wherein the heating under shear forces is carried out in an extruder.

93. The method of any one of clauses 80-92, wherein the substantially unsorted waste is particulated.

94. The method of clause 93, wherein the particulating is carried out by a granulator.

95. A method for manufacturing an article comprising heating the composite material of any one of clauses 1-79 to cause said material to flow and forming it to a desired shape to obtain said article.

96. The method of clause 95, wherein the heating is to a temperature in the range of 100° C. and 240° C.

97. The method of any one of clauses 88-95, wherein the composite material is continuously formed and molded to a desired shape.

98. A method for preparing a composite material having one or more of the following properties at solid state: having a phase transition from a solid to a flowable state at a temperature less than about 120° C.; having no gaps between different components of the material when viewed at a magnification revealing structures above 0.1 μm; having a surface energy above about 35 dyne/cm; having a density above about 1.2 g/cm$^3$; having a potassium content above about 1 mg/g (mg potassium per 1 gm of composite material); having tensile strength of above about 4 MPa, having tensile modulus of above about 600 MPa; having flexural modulus above about 800 MPa; Having flexural strength above about 7 MPa; having a notched Izod impact above about 12 J/m; having a Charpy impact of above about 1.5 KJ/m$^2$, 1.6 KJ/m$^2$, 1.7 KJ/m$^2$, or 1.8 KJ/m$^2$; releasing volatile compounds comprising one or more of butanone, acetic acid, butanoic acid, furfural, and phenol; comprising DNA; and comprising chlorophyll;
   the method comprising:
   drying and participating substantially unsorted waste that comprises organic material and plastics to obtain dried waste material and heating while mixing the dried particulate material under shear forces to a temperature of at least about 100° C. thereby obtaining a processed composite material.

99. The method of clause 98, wherein the temperature is at least 120° C.

100. The method of clause 99, wherein the temperature is at least 140° C.

101. The method of clause 100, wherein the temperature is at least 160° C.

102. The method of clause 101, wherein the temperature is in the range of 180° C. to 220° C.

103. A method for processing waste comprising:
   drying and optionally particulating substantially unsorted waste that comprises organic matter and optionally plastics to obtain dried and optionally particulate waste material;
   heating while mixing the dried waste material to a temperature in the range of about 100° C. and about 240° C. under shear forces to obtain a composite material; and
   particulating the composite material.

104. The method of any of clauses 88-97, wherein the composite material is particulated after formation and the participated composite material is then molded into said article.

105. The method of clause 104 wherein the composite material is grinded and the grinded composite material is reheated and mixed under shear forces before it is molded to obtain the article.

106. The method of any one of clauses 104 or 105, wherein the grinded composite material is reheated and mixed with another material under shear forces before it is molded to obtained the article.

107. An article comprising two or more materials adhered to or blended with one another, wherein at least one of said materials is the composite material of any one of clauses 1-79 or a composite material obtained by any one of the methods of clauses 80-94 and 104-106.

108. The article of clause 107 wherein the two or more materials are essentially homogenously blended with one another.

109. The article of clause 107 or 108, wherein said blend comprises polyethylene, polyvinylchloride, polypropylene, unsorted plastic waste or a mixture thereof.

110. The article of clause 108 or 109 comprising a first material and a second material adhered to one another, wherein at least one of the first or second material is a composite material as defined in any of clause 1-79.

111. A pallet for storage or fork-lifting made of a blend comprising a composite material as defined in any of clauses 1-79.

112. The pallet of clause 111 prepared by injection molding of said blend.

113. The pallet of clause 111 or 112, wherein said blend comprises said composite material and high density polyethylene.

114. A storage article made of a blend comprising a composite material as defined in any of clauses 1-79.

115. The article of clause 114, being a tool box.

116. The article of clause 114 or 115, prepared by injection molding.

117. The article of any one of clauses 114-116, wherein said blend comprises polyethylene, polyvinylchloride, polypropylene, unsorted plastic waste or a mixture thereof. thereof.

118. A weight-holding panel made of blend comprising a composite material according to any one of clauses 1-79.

119. The panel of clause 118, being usable as shelf.

120. The panel of clause 118 or 119 prepare by injection molding.

121. The panel of any one of clause 118-120, where said blend comprises homo polypropylene and calcium carbonate.

122. An article made of a blend comprising the composite material of any of clauses 1-79, a polypropylene copolymer and carbon black, 123. An article made of a blend comprising the composite material of any of clauses 1-79, prepared by molding.

124. An article made of a blend comprising the composite material of any of clauses 1-79, prepared by injection molding.

125. An article made of a blend comprising the composite material of any of clauses 1-79, prepared by rotational molding.

126. An article made of a blend comprising the composite material of any of clauses 1-79, prepared by compression molding.

127. The article of any one of clauses 122-126, wherein the blend comprises a plastic material.

128. The article of clause 127 wherein the plastic is polyethylene, polyvinylchloride, polypropylene, unsorted plastic waste or a mixture thereof. 128.

The article of any one of clauses 107-127, wherein paint is applied on at least visible surfaces of the article.

129. Use of substantially unsorted waste for the production of articles as defined in anyone of clauses 122 to 128.

130. A method for preparing articles, comprising:
providing the composite material of any one of clause 1-79 or preparing a composite material in a manner as defined in any of clause 80-102;
optionally processing the composite material by one or both of (i) grinding the composite material, and (ii) sieving the composite material;
heating and mixing the composite material under shear forces to obtain a melt; and
shaping the melt into an article.

131. The method of clause 130, comprising mixing the composite material before, during or after the heating and mixing with one or more other materials, whereby said melt is a mixture of said composite material and the one or more other materials.

132. The method of clause 130, comprising adding other materials to said composite material during heating and mixing.

BRIEF DESCRIPTION OF THE DRAWINGS

In order to understand the invention and to see how it may be carried out in practice, embodiments will now be described, by way of a non-limiting example only, with reference to the accompanying drawings, in which:

FIGS. 13A-13E show several examples of articles prepared from a composite material according to some examples described below, wherein FIG. 13A shows a pallet prepared by injection molding, FIG. 13B shows a composter bottom part prepared by injection molding, FIG. 13C shows a sewer opening cover prepared by injection molding, FIG. 13D shows flower pots prepared by cold compression molding, and FIG. 13E shows a tubular body prepared by extrusion;

DETAILED DESCRIPTION OF THE INVENTION

Figure 1:
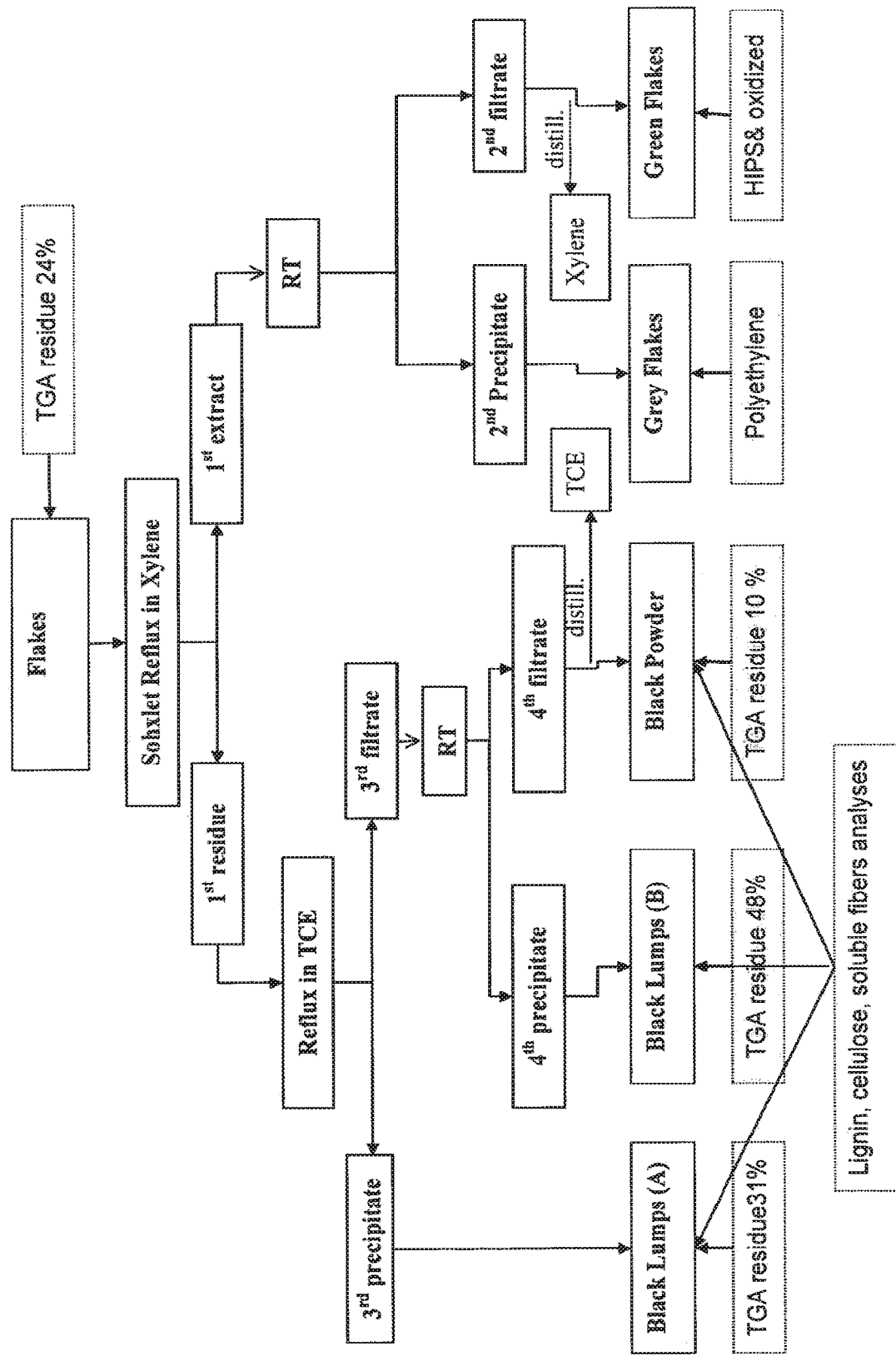
FIG. 1 is a flow chart of analysis by extraction in organic solvents of a composite material according to an embodiment of the invention.

The present invention is based on the surprising finding that subjecting substantially unsorted waste (SUW) to shear forces at temperatures above 100° C. resulted in a composite material having thermoplastic properties. The SUW is substantially unsorted municipal solid waste.

Municipal solid waste (MSW) as used herein refers to residential and commercial trash (garbage), that is discarded by people and industry and is typically composed of primarily, wood, wood derived products such as paper, cardboard, tissues and the like, food scraps and plastics. In 2007 the Environmental Protection Agency reported in the United States that MSW was composed of the following ingredients, as percent by weight: Paper (32.7%), Glass (5.3%), Metals (8.2%), Plastics (12.1%), Rubber, leather and textiles (7.6%), Wood (5.6%), Yard Trimmings (12.8%), Food Scraps 12.5%), Other (3.2%). Israel reported a similar analysis for 2005: Organic matter (40%), Plastic (13%, predominately thermoplastics), Cardboard (8%), Paper (17%), Textiles (4%) Disposable diapers (5%), Other (7%), Glass (3%) and Metals (3%). These percentages are averages and actual percentages will vary from location to location, but it is clear that the predominant components in these wastes are plastics and cellulosic type materials, e.g. wood and components derived from wood, e.g. paper, tissues, paperboard, etc,. The MSW usually contain moisture.

The thermoplastic component in the waste includes, for example, polyolefins, polystyrene, polyvinylchloride, polyethylene terephthalate, polyacrylonitrile, polybutadiene, polystyrene, polycarbonate, nylon, and the like. Thermosets make up a very small portion of the normal MSW but can be part of the waste stream.

The composite material disclosed herein has unique thermoplastic properties. The term "thermoplastic properties", as used herein, refers to a property where a solid or essentially solid material turns upon heating into a hot flowable material (soft, malleable, moldable, remoldable and, extrudable, weldable material) and reversibly solidifies when sufficiently cooled. The term also denotes that the material has a temperature or a temperature range at which it becomes a hot flowable material. This property is similar to that possessed by thermoplastics themselves.

In accordance with the present invention, the waste is substantially unsorted waste (SUW). In the following the term "substantially unsorted waste" or "SUW" will be used to denote waste material (including solids) that is either unsorted, e.g. obtained as is, i.e. in the form it is received at a solid waste management facility or at a waste dump or from a landfill; or waste material from which one or more components are optionally selectively removed before processing. Such components are typically those that have an economical value as recyclable materials or articles, which have not already been removed through recycling at the source of the waste. Such components may include, without being limited thereto, metal parts especially batteries, aluminum and iron, glass, ceramics, paper, cardboard and plastic containers such as bottles, storage bowls, commercial plastic ready to cook containers etc. Typically, the SUW used for subsequent processing to yield the composite material of the invention constitutes at least about 80% by weight of the original waste material and at times above 90% and even 95% of the original weight of the waste material (namely the components that are removed from the unsorted waste constitute, respectively, up to about 20%, up to about 10% and up to about 5% of the original unsorted waste material). For clarity it is to be noted that the % content when made in references to the unsorted or SUW denoted the respective relative content (w/w) on a total dry basis, with water excluded.

The SUW used, according to the invention, may either be received prior to processing as a wet material (namely, including water and/or moisture) or may be received as dry material. Drying may be achieved either by placing the waste outdoors and allowing it to dry, under a stream of dry air, in an oven chamber or by squeezing the liquid out. In the context of the present invention, drying includes removal of at least 50% of the moisture, at times 60%, 70%, 80%, 90% and even, at times, up to 95% of the moisture initially contained in the SUW. It is noted that 100% percent of the moisture does not have to be removed and in some applications it is even preferred that some water remains in the SUW for the subsequent procedure for preparing the composite material. Typically, the SUW obtained after drying and used for preparing to composite material that is disclosed herein has water and optionally other volatile liquids such as ethanol, at content in the range of about 1% and about 11%. While not wishing to be bound by theory, it is currently believed that the residual remaining water content plays a role is the chemical process that occur that convert the dried or semi-dried SUW into the composite material of the present invention.

As stated above, the SUW is generally municipal solid waste and may include, for example, solid, semi-solid and/or fluid materials, resulting from human and animal activities and may originate from municipal waste, industrial waste (e.g. chemicals, paints, plastics, sand), agricultural waste (e.g. farm animal manure, crop residues), sludge, and may be waste including hazardous material, etc. The waste may be decomposable combustible waste, such as paper, wood, fabric or non-combustible waste, such as metal, glass, sand and ceramics. The waste may also originate from landfills including old landfills. One of the benefits of the invention is in reducing the contents of landfills to produce useful products while at the same time reducing the volume of the landfill.

The composite material of the invention may comprise plastic in the range of between about 0 and about 40%, typically, however not exceeding about 35% or even about 30% of the composite material. The amount of plastic in some embodiments may be at least 1%, 3%, 5%, 10% or 15%; in some embodiments the plastic material may be in an amount less than 30%, 25% or even less than 20%.

The composite material in some embodiments may comprise at least about 10% organic matter (other than synthetic polymeric material), typically at least about 15%, about 20%, about 25%, about 30%, about 35% or even about 40%; in some embodiments the composite material may comprise up to about 90%, typically less than about 85%, about 80%, about 75% or even less than about 70% of organic matter.

According to some embodiments the composite material comprises at least about 1%, about 2%, about 5%, about 10% or at least about 15% of inorganic matter; by some embodiments the composite material comprises less than about 50%, about 40%, about 30% or even less than about 20% of inorganic matter.

At times, the properties of the composite material may be fine-tuned by adding certain constituents to said material either during the preparation thereof or after it is formed. A non-limiting example is active carbon that may absorb some volatiles and thereby remove some malodors. At times the SUW may be supplemented with some waste-originating material. At times the waste may be supplemented with recycled or virgin material.

The organic material may include, without being limited thereto, any material that was or is living, such as garden waste (leaves, grass clippings, branches, hay, flowers, sawdust, wood chips and bark), food waste (fruit, vegetables, grains, meat, egg shells, bones, oil, fat, or dairy products) as well as others (paper, feces, dust, hair, wood ash). Since the composite material comprises organic material it inherently comprises fingerprints that are unique to materials of biological origin e.g. DNA, proteins, chlorophyll and a high content of potassium, nitrogen and phosphorous etc. as compared to materials of synthetic origin.

While the composite material typically comprises plastic material in the range of about 10-30%, a composite material of the invention may also be prepared in a method as described herein without any plastic matter. For example, the product of extruding corn flour or organic waste (without plastic), at a temperature of about 200° C., were found by the inventor to be flowable materials at a temperature of at least about 100° C. When as little as 10% wt. plastic was mixed with the organic waste, the extrudate could further be processed by injection molding to obtain a composite material having similar mechanical properties as those obtained from SUW.

As used herein, the term "plastic" should be understood as having the general meaning as known by those skilled in art.

Without being limited thereto, the plastic material typically comprises plastic materials such as synthetic polyolefins (e.g. high density polyethylene (HDPE), low density polyethylene (LDPE), polypropylene (PP)), polyethylene terephthalate (PET); polystyrene (PS) (including high impact polystyrene, HIPS), rigid and plasticized polyvinylchloride (PVC), ABS (acrylonitrile butadiene styrene), PU (polyurethane), polyamides (PA), and ethylene vinyl alcohol copolymers (EVOH).

The organic material in the composite material of the invention comprises organic fibers. While the term "organic fiber" may be understood to include organic fiber of natural as well as of synthetic (man made) fibers it is used herein to predominantly denote fibers comprising cellulose, hemicellulose and/or lignin and combinations of same, all being from natural sources. The combination of cellulose, hemicellulose and lignin is referred to at times by the term "lignocellulosic biomass". It is to be understood that in the context of the present invention, the term "lignocellulose" has the meaning as generally known by one skilled in the art. Other types of organic fibers that may be present are viscose, cellulose and modified cellulose.

According to one embodiment of the invention, the composite material has a surface energy that is above about 35 dyne/cm, preferably above about 40 dyne/cm and even more preferably above 45 dyne/cm. For the sake of comparison, the surface energy of polyethylene is about 35 dyne/cm and of polypropylene is about 31 dyne/cm, and of Polytetrafluoroethylene (PTFE/Teflon) 18-20 dyne/cm.

It is well understood that in order for two materials to adhere to each other their surface energies (surface tension), should be alike.

In other words, on a high surface energy material, a polar material will spread into a thin layer (or "wet-out") to assure a stronger bond. The composite material of the present invention has a surface energy that is higher than polyolefins. This relatively high surface energy of the composite material of the invention permits strong interaction at its surface with other polar substances, such as paint, adhesives, wood, various stones and others.

In one embodiment, the composite material of the invention has a density above about 1.2 g/cm$^3$, typically in the range of 1.2-1.7 g/cm$^3$.

The composite material of the invention may also be characterized by its tensile modulus of elasticity (also referred to at times by the terms elastic modules or tensile modulus). The tensile modulus of elasticity is generally defined by a material's resistance to be deformed elastically (i.e. non-permanently) when a force is applied to it. The higher the force required, the stiffer the material is. Typically, the composite material has a tensile modulus of elasticity above about 600 MPa. Thus, the composite material of the invention when formed into a structure having a shape such a rod, plank or the like is characterized by stiffness comparable to that of other stiff thermoplastic materials such as polystyrene, polycarbonate, polymethylmethacrylate, (PMMA), polyethylene and others.

The composite material of the invention may also be characterized by one or more of the following characteristics:

Tensile strength, namely, the stress at which a material fails or permanently deforms under tension. Typically, the tensile strength of an injection molded composite material of the invention is above about 5 MPa, 6 MPa, 7 MPa and even above 8 MPa;

Flexural strength (also referred to at times by the term bend strength), namely, the stress applied to a material at its moment of rupture. Typically, the flexural strength of an injection molded composite material of the invention is above about 7 MPa, above about 9 MPa and even at about 11 MPa.

Flexural modulus refers to the material's stiffness in flexure, namely, its resistance to deformation by an applied force. Typically, flexural modulus of an injection molded composite material of the invention is above about 2,000 MPa, above about 3,000 MPa, and even about 3,500 MPa.

Impact strength (notched Izod impact), refers to the ability of a material to withstand shock loading. Typically, the impact strength of an injection molded composite material of the invention is above about 12 J/m, above about 13 J/m, 15 J/m and even of above about 17 J/m.

Charpy Impact (Charpy V-notch test) refers to the energy per unit area required to break a test specimen under flexural impact. Typically the Charpy impact of an injection molded composite material of the invention is above about 1.5 KJ/m$^2$, 1.6 KJ/m$^2$, 1.7 KJ/m$^2$, or even 1.8 KJ/m$^2$.

Where metal is retained in the SUW and not removed prior to further processing, the mechanical properties including tensile strength, flexural strength, flexural modulus, impact strength and Charpy Impact, may be improved. The mechanical parameters may also vary by the fine details of the manufacturing process. The process parameters may, thus, be fine-tuned to yield quantitatively different mechanical properties within the range defined above. It is to be noted that the value of the mechanical properties measurements may also, at times, change somewhat from one measuring equipment to another.

Odor profile (volatiles profile), refers to the mixture of volatile compounds that are present in the composite material which are released therefrom and contribute to the specific odor of the composite material. The odor profile may be determined by a head space GCMS test as detailed infra. Each compound of the volatile profile may be present in varied quantities but not less than a detectable amount in a head space GCMS test. Typically, the volatiles profile of the composite material of this invention comprises a combination of many of typical compounds that are part of the odor profile of plastic and organic waste, and in addition several compounds that are unique to the composite material comprising butanone, acetic acid, butanoic acid, furfural, and phenol (unless an odor absorbent is present). Notwithstanding the above, several compounds which are typical components of the volatiles profile of organic waste or plastic are absent from the volatiles profile of the composite material such as dimethyldisulfide, 2-pentyl furan, benzaldehyde, and limonene. It should be noted that these volatiles profile may vary by addition of odor absorbent or by varying the reaction conditions temperature, initial moisture content in the SUW or venting.

The composite material according to the invention is typically obtained through processing of SUW. In one embodiment, the SUW comprises organic material and plastics.

It has been founds in accordance with the invention, that the novel composite material possesses a dark color. Without being bound by theory, it appears that the dark color is associated with a certain component or components which firmly adhere to other components of the composite material. It is to be understood that in the context of the present invention a dark color means that the composite material absorbs all or almost all wavelengths of the visible light spectrum or, in other words, does not emit or reflect light in any or almost any part of the visible spectrum.

It is noted that when fractionated into components by a variety of fractionation techniques, dark-colored component(s) appeared to remain associated with many of the fractionation products.

Without wishing to be bound by theory, the dark color seems to be a result of reactions of or between various food residues during the formation of the composite material.

In accordance with an embodiment of the invention, the composite material having the thermoplastic properties has a substantially continuous medium when viewed at a magnification that reveals structures having a size of above about 0.1 µm. The term "substantially continuous medium" should be understood as referring to a dense compacted particle-containing medium without significant gaps (voids) that may be detected. For example, when sectioning the material and viewing the sections under a microscope, typically an electronic microscope, at the magnification that reveals structures of a size above about 0.1 µm no gaps are observed. It should be understood that the substantially continuous particle-containing medium may contain some voids such as, for example, voids of trapped gas, trapped water vapor, gaps formed between solid micro-particles, etc. The continuous medium usually includes also particles and the other materials of the medium are then tightly compacted around the particles, essentially without gaps, at the aforementioned magnification. It is noted that many of the particles are fibrous in shape. In one preferred embodiment, the substantially continuous medium comprises particles of material substantially evenly distributed there through.

The term "essentially without gaps" should be understood as meaning that a few or only small gaps will be seen at said magnification. It should be understood that at higher magnifications, some additional gaps may be seen. Again, not wishing to be bound by theory, such tight interaction may be attributed to surface adherence properties of the novel composition of matter of the invention.

In accordance with another embodiment of the present invention, the composite material flows at a temperature lower than that of commercial thermoplastic materials having relatively low melting points, such as high density (HD) or low density (LD) polyethylene (PE). In accordance with some embodiments of the invention, the novel composite material turns into a flowable material (moldable, malleable, remoldable, extrudable etc.) at temperatures below 130° C., at times below 125° C., 120° C., 115° C., 110° C. and occasionally even below 105° C., 100° C., 95° C. or 90° C. This means that the composite material of the invention can be initially formed into pellets and the like and stored before further processing into usual articles. The further processing may include injection molding, compression molding or other article fabricating processes. Further processing may also include mixing virgin or recycled plastic with the composite material which may be in the form of pellets or in any other suitable form. This mixture can then be formed into usable objects.

In accordance with another aspect of the invention, there is provided a method of processing waste material, comprising: drying and particulating substantially unsorted waste (SUW) that comprises organic material and plastics to obtain dried particulate waste material; heating under shear forces the dried particulate waste material, to a material temperature of at least about 100° C., preferably above 115° C., 120° C., 125° C. and above; whereby a resulting composite material with thermoplastic properties is obtained and collected. Sufficient shearing, mixing and time are generally required so as to allow the entire waste mass to reach the indicated temperature. It is thus generally preferred to add heat to the process and not to rely solely on factional heating caused by the shearing and mixing. Thus, according to one embodiment, the dried particulate waste material is heated to a temperature of between about 100° C. and 240° C., and preferably to a temperature of between about 120° C. and 220° C., or between 180 and 220° C. while being subjected to high shear forces such as obtained using a screw extruder as more fully described hereinafter.

As indicated above, the term "dried particulate" means waste that has been reduced in size and at least some amount of volatile liquids (i.e. liquids having a vapor pressure of at least 15 mmHg at 20° C., e.g. water and ethanol) have been removed therefrom. The term "dried particulate" should not be interpreted as describing completely dried particles. On the contrary, it was found and that in order to produce the composite material having the properties as described herein, it is often desired to maintain some level (e.g. above 1%) of water in the particles. The amount of liquid removed from the SUW can be controlled and may be fine-tuned to the intended use of the eventually obtained composite material. Particulating may precede drying or vice versa and the drying step may include a sequence of drying, particulating, further drying and further particulating etc. A sequence of a few cycles each including a particulating procedure and drying (in this or the opposite order) may be useful, under some embodiments, to yield initially-processed SUW that is usable as a starting material for preparing the composite material of the present invention, with a fine-tuned content of water and/or other volatile liquids.

The dried particulates, when heated under shear forces at a temperature above 130° C. are considered, in the context of the present invention, sterile particulates, meaning that pathogens contained in the waste such as germs, viruses and bacteria are destroyed.

The participating of the SUW (either while drying or before or after drying) may take place by granulating, shredding, chopping, dicing, cutting, crushing, crumbling, grinding etc. A variety of devices are available in the art for particulating waste material such as shredders, grinders, chippers and granulators. Due to the presence of metal glass clay and stones in the SUW it is preferable to use blades or plates that are made of robust materials such as stainless steel or titanium. Typically, the heating under shear forces of the dried participated waste takes place in a compounder, including, without being limited thereto, an extruder, an internal mixer (Banbury), a co-kneader, continuous mixer etc. It is preferable that the compounder provides sufficient shear and mixing time so that the composite material collected upon cooling is essentially evenly dispersed matter throughout the mass/body of the composite material.

An extruder typically comprises a heated barrel containing rotating therein a single or multiple screws. When more then a single screw is used, the screws may be co-rotated or counter-rotated. Screws may be intermeshing, or non-intermeshing. The extrusion apparatus may be a single extruder or combinations of extruders (such as in tandem extrusion) which may be any one of the extruders known in the plastics industry, including, without being limited thereto, single screw extruder, tapered twin extruder, tapered twin single extruder, twin screw extruder, multi-screw extruder. A specific type of extruder in the context of the invention is a single screw extruder. In some embodiments the extruder is equipped with a venting zone. In some embodiments the nozzle of the extruder is chilled during the extrusion process.

In some embodiments, the particulating also includes separating from the particulated matter elements of economical value and/or including, as discussed above, recyclable material or articles, such as batteries, aluminum and iron, glass, ceramics, paper, cardboard etc. The separation from the particulate matter of such elements may be executed by the use of suitable sieves, magnetic separators, eddy current separators, floatation systems, etc.

In accordance with some embodiments, the resulting composite material may be reheated to a temperature above 100° C., above 130° C. and even above 180° C., at which it turns into soft, flowable matter and the material can then be, extruded, reshaped, remolded, etc to a desired shape. For example, in this manner, articles of a defined configuration may be manufactured. For example, flower pots, housing siding, deck materials, flooring, furniture, laminates, pallets, septic tanks and the like can be prepared, e.g. by further processing the composite material.

In one embodiment, the resulting composite material may be reheated under shear forces more than once, to yield a composite material having properties in the described range. The conditions under which reiteration of the shearing and heating step is performed may the same or different as those which were applied in the preceding shearing and heating. In any case, the reiteration is performed under the range of conditions described above.

Various additives, fillers, etc., may be added to the reheated composite material, or even when the dried particulates are heated under shear forces, to impart certain desired properties to the article eventually obtained after cooling. Examples of fillers may include, without being limited thereto, sand, minerals, recycled tire material, concrete, glass, wood chips, thermosetting materials, other thermoplastic polymers, gravel, metal, glass fibers and particles, etc. These fillers may originate from recycled products, however, virgin materials may also be employed. Other additives may be added to improve the appearance, texture or scent of the composite material such as colorants, odor masking agents (e.g. activated carbon), oxidants (e.g. potassium permanganate) or antioxidants. Nonetheless it is noted that the properties of the composite material of the present invention and its potential uses are attained without the need to use binders or plasticizers although these may be added under some embodiments.

In certain embodiments of the invention there is also provided a method for preparing an article that has a defined shape, whereby waste, preferably SUW, is processed in a manner as defined above; and then either while maintaining the temperature of the resulting material above 100° C. or following re-heating of the material to a temperature above 100° C., the material is molded to assume the desired configuration. In some embodiments, the method may comprise preparing an article comprising two or more materials adhered to one another to form laminates and the like.

In accordance with another embodiment of the invention, the novel composite material may itself serve as a filler or additive in the manufacture of an article, e.g. to be added, for example, to a thermoplastic hot melt comprising for example a virgin or recycled plastic. It has been found that when using the novel composite material of the invention as an additive for virgin plastics, the resulting material can be molded using less energy for filling and cooling the molds. It is thus believed that using the composite material of the invention may reduce process time as well as energy consumption in manufacturing processes of various end products.

The composite material of the invention as well as the material obtained by mixing the composite material with a plastic may thus be processed through a variety of industrial processes, known per se, to form a variety of semi-finished or finished products. Non-limiting examples include building material, panels, boards, pallets, pots, component of plant growth substrate, and many others. In such semi-finished or finished products, the composite material of the invention may be the sole component or may be in a mixture with other materials. In accordance with the invention the products may include also laminates adhered to each other, where at least one layer comprises the composite material of the invention. Such multi layer structures may be obtained by lamination, co-calendering, co-compression, co-extrusion or tandem extrusion of two or more materials (one being the composite material of the invention) so as to form the multi-layer product.

The invention also provides a method for compacting waste comprising drying and particulating SUW, such as MSW, that comprises organic material and plastics to obtain dried particulate waste material; heating the dry particulate waste to a temperature of at least about 100° C., preferably above 130° C., under shear forces to obtain a resulting material; and preparing blocks of the resulting material. In such compacting, the material may be processed in a batch or continuous manner and be formed into blocks or other shapes. A typical example is the processing of the waste by extrusion.

In another embodiment, the composite material, especially if substantially metal and glass-free, may be burned to provide an energy source.

According to another aspect of the invention, there is provided a method for preparing a processed material having one or more of the following properties at room temperature:
  having a phase transition from a solid to a flowable state (namely a state in which the material loses some its rigidity, becoming softer and can be formed so as to change state without breaking) at a temperature less than about 120° C.,
  having a density above about 1.2 g/cm$^3$,
  having a surface energy above about 35 dyne/cm,
  having potassium content above about 1 mg/g,
  having tensile strength of above about 4 MPa,
  having a tensile modulus of elasticity (tensile modulus) of above about 600 MPa,
  having flexural modulus above about 800 MPa or 1000 MPa,
  having flexural strength above about 7 MPa or 10 MPa,
  having notch impact strength above about 12 J/m,
  having Charpy impact of above about 1.5 KJ/m$^2$, 1.6 KJ/m$^2$, 1.7 KJ/m$^2$, 1.8 KJ/m$^2$ or 2.0 KJ/m$^2$.
  releasing volatile compounds comprising one or more of butanone, acetic acid, butanoic acid, furfural, and phenol. These volatiles have a characteristic odor which may fee controlled by adding absorbents such as active carbon.

In accordance with this aspect of the invention, the method comprises drying and particulating substantially unsorted waste that comprises organic material and plastics to obtain dried waste material and heating the dried particulate material under shear forces to a temperature of at least about 100° C., preferably above 130° C., thereby obtaining the processed material.

The invention also provides a method for compacting waste, comprising: drying and particulating substantially unsorted waste that comprises organic material and plastics to obtain dried particulate waste material; heating the dry particulate waste to a temperature of at least 100° C. material under shear forces to obtain a resulting material; and preparing blocks of the resulting material.

DETAILED DESCRIPTION OF NON-LIMITING EXAMPLES

Example 1

Processing of Domestic Waste into a Composite Material

Processing Equipment

In the following processes various devices and systems were employed. It is to be understood that while some of the devices were constructed by the inventor, all are based on conventional devices. These include a shredder, a single screw extruder, a compounder (Banbury), an injection molding machine, a compression molding press and any other machine in which the material undergoes shearing and/or heat, such as a granulator, pelletizing press, mill etc.

Two single screw extruders were employed in the following examples. The first is an self-designed extruder (screw diameter: 70 mm, screw length: 2650 mm, clearance of screw to barrel: 0.1 mm, die and adapter length 190 mm, die opening diameter: 10 mm) and the second is an Erema RM 120 TE (screw diameter: 120 mm, screw length: 4000 mm, clearance of screw to barrel: 0.1-0.2 mm, die and adapter length 370 mm, die opening diameter: 50 mm), both having a venting zone.

Procedure (i) Preparation of Extrudate I

Substantially unsorted waste (SUW), collected from private households was shredded in a shredder equipped with titanium blades and then ground into particles of a size of between several microns to several centimeters. The ground particulates were then air dried for a few days, dried under a stream of dry air, until at least some, but not all liquid was removed (herein referred to by the term "dried particulates"). The dried particulates were fed into single screw extruder that was set at a temperature along the extruder being higher than 150-180° C. but not more than 210° C. The rotation rate of the screw in the extruder was 60-90 rpm. The particulated material was processed in the extruder with a residence time of less than about three minutes. The extrudate was copied to room temperature (herein "extrudate I"). Visual inspection of the extrudate suggested that it contains fibrous material as well as substances having a melting point higher than the process temperature (e.g. glass and metal).

(ii) Preparation of Extrudate II

Substantially unsorted waste (SUW), collected from private households was shredded in a shredder equipped with a titanium blades and then ground into particles of a size of between several microns to several centimeters. The ground particulates were then sieved to collect particulates in the range of 100-200 mm in diameter. The 100-200 mm particulates flow passes through a magnet that removes at least some of the original magnetic metallic content of the SUW. After separation of magnetic metals the remaining particulate flow is ground and sieved again to obtain particulates having an approximate size of 20 mm. The ground particulates were then air dried for a few days, dried under a stream of dry air, until at least some, but not all liquid was removed to obtain dried particulates. The dried particulates were fed into single screw extruder (Erema or the home-made extruder) that was set at a temperature of 180° C. and a rotation rate of about 50 rpm. The particulated material was processed in the extruder with a residence time of between about 3 minutes to about 5 minutes. The extruder nozzle was cooled in order to increase the pressure and the shearing force in the extruder. The extrudate was cooled to room temperature (herein "extrudate II"). At times the extrudate was Visual inspection of the extrudate suggested that it contains fibrous material as well as substances having a melting point higher than the process temperature (e.g. glass and metal).

Preparation of Moldings, Granules and Test Specimen

The extrudate (either extrudate I or extrudate II), before cooling, was subjected to hot compression molding or cold compression molding after it was cooled. At times, the extrudate were granulated (herein "the granules").

Further alternatively, when indicated, the granules were subjected to injection, rotation or compression molding to obtain test specimens (herein "the test specimen").

The extrudate and its processed variations (i.e. the granules, and the test specimens) had a unique dark color and were found to be unexpectedly stiff.

Example 2

Characterization of the Composite Material

Composition Analysis
1. Extraction of Extrudate I in Organic Solvents

The extrudate I was subjected to a series of consecutive extractions using different solvents where each extracted fraction was then analyzed by various spectral techniques; NMR, (Avance 200 and 400 MHz instruments), IR, TGA, elemental analysis, and ICP, (the results are not shown but discussed below).

FIG. 1 outlines the extraction steps. Specifically, 10 g of the prepared extrudate were refluxed for 24 hours in a Soxhlet apparatus in xylene. 7.1 g of insoluble material ($1^{st}$ residue) remained in the thimble. The filtrate extract ($1^{st}$ extract) was green. On cooling to room temperature (RT) a precipitate ($2^{nd}$ precipitate) formed. On filtering and drying this yielded grey flakes (2.0 g). The second filtrate was distilled to remove the xylene, leaving a residue of green flakes (0.8 g) in the flask. Analysis (FTIR, Bruker Alpha P instrument), NMR (Avance 200 and 400 MHz instruments) and elemental analysis (Spectrolab, Rehovot according to AOAC International method 973.18 for Fiber and Lignin) suggested that the grey flakes are primarily polyolefins such as polyethylene and polypropylene. The xylene was evaporated from the 2nd filtrate to yield 0.8 g green flakes. Analysis (according to the techniques described above) suggested that these green flakes comprise high impact polystyrene (HIPS), oxidized PE, and some traces of chlorophyll denaturant.

The insoluble $1^{st}$ residue from the reflux with xylene extraction was further processed. Specifically, the 1st residue was refluxed in trichloroethanol (TCE) for 20 hours in a Soxhlet apparatus. A $3^{rd}$ insoluble precipitate produced was removed by filtration yielding 3.76 g of black lumps-like compact masses ("Black Lumps (A)").

The reflux in TCE also produced a $3^{rd}$ soluble filtrate which was allowed to cool to room temperature (RT). As a result a $4^{th}$ precipitate and $4^{th}$ filtrate were formed. The $4^{th}$ precipitate also had the appearance of black lumps ("Black Lumps (B)") and weighed 1.15 g. TCE was evaporated off the $4^{th}$ filtrate to yield 2.55 g of black powder. The black powder received from the $4^{th}$ filtrate and the black lumps received from the $3^{rd}$ and $4^{th}$ precipitate were identified as comprising lignin, cellulose and soluble fibers (the cellulose and lignin analyses were conducted according to AOAC International method 973.18 for Fiber and Lignin, which distinguishes between cellulose and lignin).

Thermogravimetric analysis (TGA, TA Instruments TGA 2050) revealed 10%, 48% and 31% of incombustible residues in each of $4^{th}$ filtrate, $4^{th}$ precipitate and $3^{rd}$ precipitate, respectively (as shown in FIG. 1) that are attributed to silica, metals, clay, and other inorganic matter originally in the waste, as determined by the ICP tests. A TGA analysis on the non-extracted unsorted waste gave a value of 24% incombustible residues.

The composition of the extrudate was determined using FTIR, NMR, elemental analysis etc. The results show that it contained about 28% plastics, about 55% cellulose material and about 20% metals glass and biomass other than cellulose.

2. Extraction of Extrudate I in Hot Water

Hot water extractions were performed on a different sample of the extrudate I, where concrete and tuff (volcanic ash) were used as controls. Specifically, extrudate, concrete or tuff were subjected to water reflux for 24 hours after which the following parameters were measured in the water: Total Organic Carbon (TOC); Dissolved Organic Carbon (DOC); Total Dissolved Solids (TDS); Total Organic Halides (TOX); Phenol Index (PI); Polycyclic Aromatic Hydrocarbons (PAHs); Benzene/Toluene/Ethylbenzene/Xylene (BTEX) and Anions. The results of the analysis are provided in Table 1.

TABLE 1

Analysis of hot water extractions

| Sample | TOC (mg/g) | DOC (mg/g) | TDS (mg/g) | TOX (µg/g) | PI (µg/g) | PAHs (µg/g) | BTEX (µg/g) | Anions[1] (mg/g) |
|---|---|---|---|---|---|---|---|---|
| Extrudate | 7 | 16 | 18 | <5 | <5 | 0.015 | 0.07 | 2.257 |
| Concrete | 0.62 | 17 | 21 | <5 | <5 | nd | 0.08 | 3.37 |
| Tuff | 0.16 | 0.38 | 3 | <5 | <5 | nd | 0.05 | 0.589 |

[1]The main anions that were found were Cl—, F—, NO$_3$—, and, SO$_4$—
nd = not detected In addition, NMR and FTIR provided evidence for the existence of carboxylate groups which without being bound to theory may originate from sodium polyacrylate degradation products, from diapers or carboxylic acids derived from natural sources (e.g. ascorbic acid from fruits, acetic acid due to fermentation and oxidation of sugars).

3. Ion Content of the Extrudate Following Extraction in Hot Water

The inorganic content of extrudate I and II (digested by concentrated nitric acid and exposed to 650 watt microwave radiation for 10 minute) or granules following extraction in hot water was also determined, using Inductively Coupled Plasma (ICP) elemental analysis and the results are presented in Table 2. Non-treated flakes were used as control.

TABLE 2

Inorganic content in extrudate I, extrudate II and hot water extracts of extrudate I, granules, concrete and tuff

| Sample | Ca | Fe | Na | Al | K | Mg | P | Zn | Si | S |
|---|---|---|---|---|---|---|---|---|---|---|
| Extrudate I (mg/g) | 32 | 4.4 | 7 | 13.9 | 5.64 | 6.14 | 0.66 | 0.36 | 71.3 | 0.74 |
| Extrudate II (mg/g) | 24.7 | 6.54 | 27.8 | 10.5 | 2.19 | 2.47 | 1.01 | 0.36 | 7.47 | 1.12 |
| Hot water extract of extrudate I (mg/g) | 0.75 | 0.01 | 0.48 | 0.01 | 0.36 | 0.07 | 0.02 | 0 | 0 | 0.13 |
| Hot water extract of granules (mg/g) | 1.06 | 0.14 | 3.84 | 0.01 | 1.89 | 0.15 | 0.12 | 0.01 | 0 | 0.02 |
| Hot water extract of concrete (mg/g) | 0.63 | 0 | 0.16 | 0.23 | 0.37 | 0 | 0 | 0 | 0 | 0.58 |
| Hot-water extract of tuff (mg/g) | 0.24 | 0 | 0.12 | 0.01 | 0.04 | 0 | 0 | 0 | 0 | 0.06 |

It has been found that both the two extrudates and the granules have relatively high potassium content, in the range of milligrams per gram. The two extrudates and the granules had 5.64 mg/g 2.19 mg/g and 1.32 mg/g of potassium content, respectively (the difference probably arising from different sources of SUW). It has thus been suggested that this high potassium content can be a fingerprint for products of the invention as this relatively high potassium content is not expected to be found in products produced from virgin synthetic polymers. The main difference between the two extrudates lies in the silicon content they exhibit which may be attributed to a higher amount of sand in the SUW batches which were used to prepare the extrudate I samples.

4. DNA Analysis

DNA was detected in the composite material. To this end, DNA was extracted from 50 mg specimens taken from (1) dried granulated SUW and (2) ground extrudate II using a Stool DNA extraction kit (Bioneer, Korea) Sample (1) was taken from dried granulated extrudate II; sample (2) is a positive control; sample (3) is a negative control and sample (4) was taken from dried granulated SUW. The samples were then mixed with PCR ready mix and inserted to PCR. The DNA extract from each sample was dyed with ethidium bromide (EB) and then subjected to gel electrophoresis. The gel was trans-illuminated with ultraviolet light with a peak wavelength of 340 nm and the resultant fluorescence of double stranded nucleic acid was observed at a peak wavelength of 610 nm.

Figure 2:
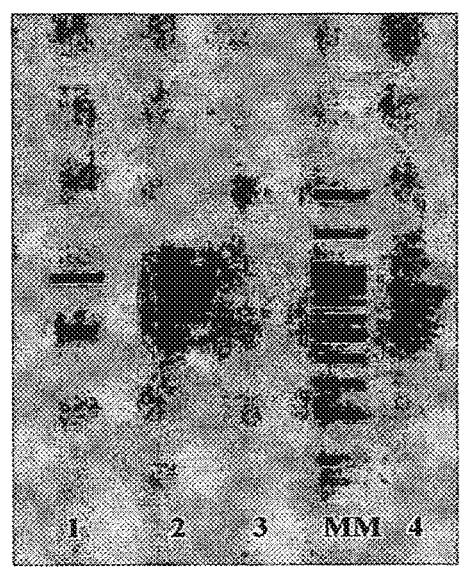
FIG. 2 is a DNA gel electrophoresis performed on extracts from three specimens: compression molding of an extrudate according to the invention (lane (1)); positive control (lane 2); negative control (lane 3); and dried and particulated substantially unsorted waste (SUW) (lane (4)); MM represents DNA molecular marker reference.

Columns 1-4 correspond to samples (1)-(4) respectively and Column M is DNA MW reference. FIG. 2 shows that samples (1) and (4), both originating from SUW contained DNA. No evidence of DNA was observed with respect to Sample (3) which contained the negative control. The fact that the product of the invention (sample (1), contains DNA may be used as a fingerprint for distinguishing products from SUW with those obtained from sorted waste. Only biological matter that can be found in unsorted domestic waste (such as food, plants, meat remains and microorganisms that are known to be present in waste fermentation) can be the source of this type of DNA.

Physical Analyses of Extrudate I

1. Thermogravimetric Analysis (TGA)

The measurements were conducted on a Thermal Gravimetric Analyzer—TA Instruments, TGA 2050, at 20 C/min heating rate in air environment. Specimens were taken from an injection molded product (series 1) and a compression molded product (series 2) that were produced from two different batches. The specimens were powdered and subjected to TGA testing that measures any loss of weight (e.g. as a result of vapor, combustion etc) as a function of temperature at a given heating rate.

Figure 3:
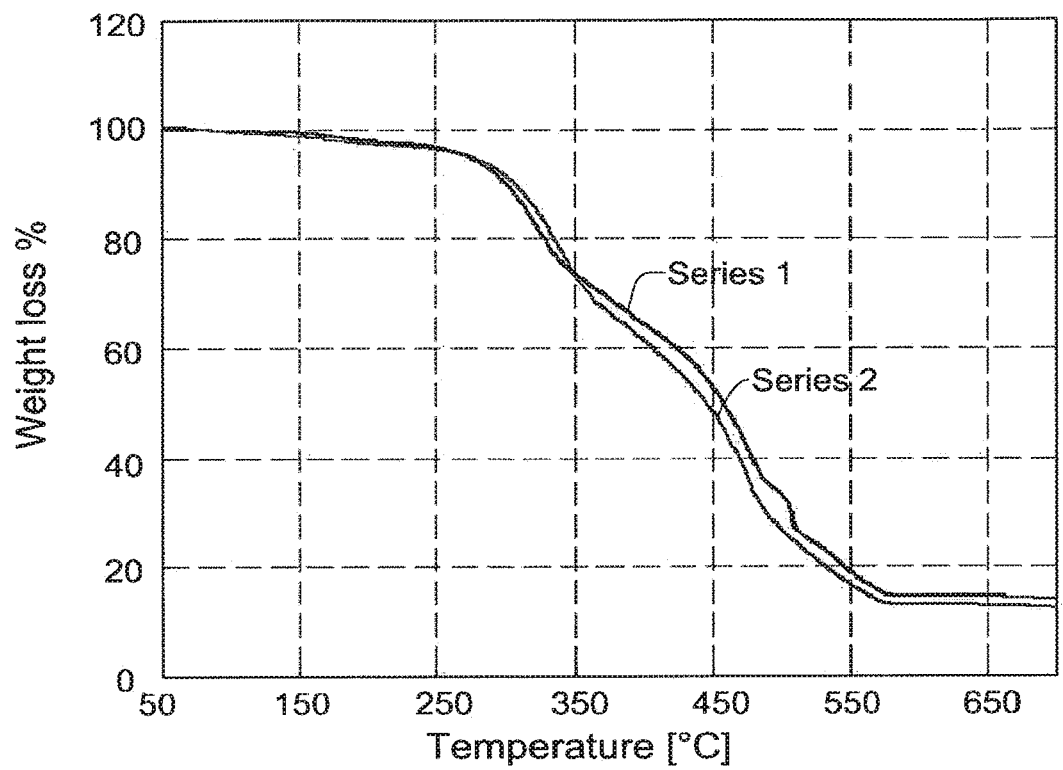
FIG. 3 is a thermogravimetric analysis (TGA) of a composite material according to an embodiment of the invention showing its % loss of weight as a function of temperature increase.
Figure 4:
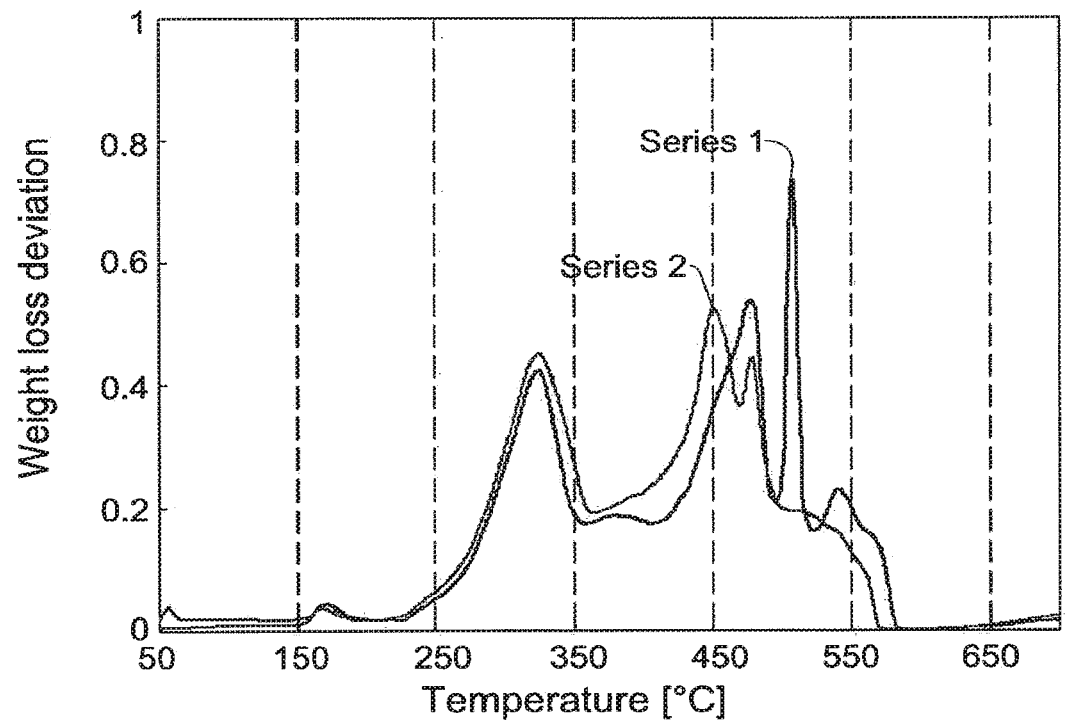
FIG. 4 is a graph showing the derivative of weight loss versus temperature from the thermogravimetric analysis shown in FIG. 3.

Results are depicted in FIG. 3, showing weight loss % vs. temperature curves, and in FIG. 4 the first derivative of weight loss/temperature, as function of temperature. The peaks shown in FIG. 4 at 170, 320° C. correspond to natural organic matter (such as cellulose) and the higher temperature peaks at 360, 450, 485, 510 and 535° C. are typical of synthetic polymers. In addition, there is always a residual inorganic fraction (20-25%) that does not vaporize or turn into carbon dioxide. The TGA curves of the injection molded product and the compression molded product in FIGS. 3 and 4 are slightly different, mainly, in the peak ratio of the peaks at 360, 450, and 485° C., while the peak at 510° C. is completely missing from the compression molded product. These differences are a result of differences in the plastic composition (such as PP, PE, etc.) between the two batches.

2. Measurement of Various Physical Characteristics

Test specimens were subjected to a series of analyses by known techniques in order to determine their physical properties, including Density, Surface Energy; Adhesion, Thermal Expansion Coefficient, Specific Heat, Water Absorption, Limiting Oxygen Index, Inorganic elements content.

Density was determined by measuring the dimensions of a flat square to obtain the volume and weighing using a Mettler analytical balance. The density is the mass in grams divided by the volume in cubic centimeters (g/cc)

Surface energy measurements were performed according to the procedure described in ASTM D2578-84.

Adhesion to the surface of an injected strip was tested using various adhesives, including epoxy, Loctite® cyanoacrylate, rubber adhesive, Polyester adhesive as well as to that of polyurethane paint. Specifically, the various adhesives were applied on the surface of individual extrudates onto which sheets of aluminum foil were respectively placed. Adhesion of the aluminum foil to the extrudates and thin strips of aluminum foil were pressed onto the adhesive so that a non adhered tail of aluminum strip remained. After drying for 24 hours the tail of the aluminum foil was tugged to try to separate the adhesive from the extrudate. The paint and adhesives remained firmly attached to the injected strip. This illustrates that the composite material has a much better surface for adhesion than most common plastics such as polyethylene.

Specific Heat was measured by differential scanning calorimeter.

For determining the limiting oxygen index a test specimen was positioned vertically in a transparent test column and a mixture of oxygen land nitrogen was forced upward through the column. The extrudate was ignited at the top. The oxygen concentration was adjusted and decreased until the combustion of the extrudate was arrested. The minimum concentration in volume percent of oxygen that supported flaming combustion was determined as the limiting oxygen index (LOI).

Inorganic elements content was measured by ICP spectroscopy.

Comparative results are provided in Table 3, below.

TABLE 3

Physical characteristics of extrudates

| Characteristic | Extrudate I | Wood | Iron | Concrete | Polypropylene |
|---|---|---|---|---|---|
| Density (g/cm$^3$) | 1.55 | 0.18-0.82 | 7.86 | 2.4 | 0.9 |
| Surface Energy (dyne/cm) | 44-46 | 30-40 | nd | >45.6 | 20-25 |
| Specific Heat (kJK$^{-1}$Kg$^{-1}$) | 4.4[1] | 1.26[2] | 0.45[2] | 0.8[2] | 1.7-1.9[2] |
| Limiting Oxygen Index, (%) | 22 | 21 | N/A | N/A | 17.5 |
| Inorganic elements, (ppm) | >20,000 | nd | 100 | nd | traces | nd = not detected;
N/A = not applicable
[1]At 80° C.
[2]At STP: Standard temperature and pressure, being according to the NISTs version 20° C. and an absolute pressure of 1 atm.

The results presented in Table 3 show that extrudate I has a density of 1.55 g/cm$^3$. This density is significantly distinct from cellulosic materials such as wood, paper, as well as from polypropylene (PP). PP is a representative of thermoplastic polyolefins having densities below 1 g/cm3.

Table 3 also shows that extrudate I has a surface energy between 44 and 46 dyne/cm, which is similar to the surface energy of polyesters, epoxies or polyurethane. When comparing to the surface energy of polyolefins, the latter can reach the value of the extrudates only if they are mixed with suitable additives.

3. Dynamic Mechanical Thermal Analysis (DMTA)

Test specimens were also subjected to DMTA (Perkin Elmer DMA 7e). Specifically, injection molded extrudate (injection at 180° C.) or compression molded waste, (i.e. not processed as described above and used as a control) were placed in a DMTA heated at 2° C./min, and twisted at a frequency of 1 Hz.

Figure 5:
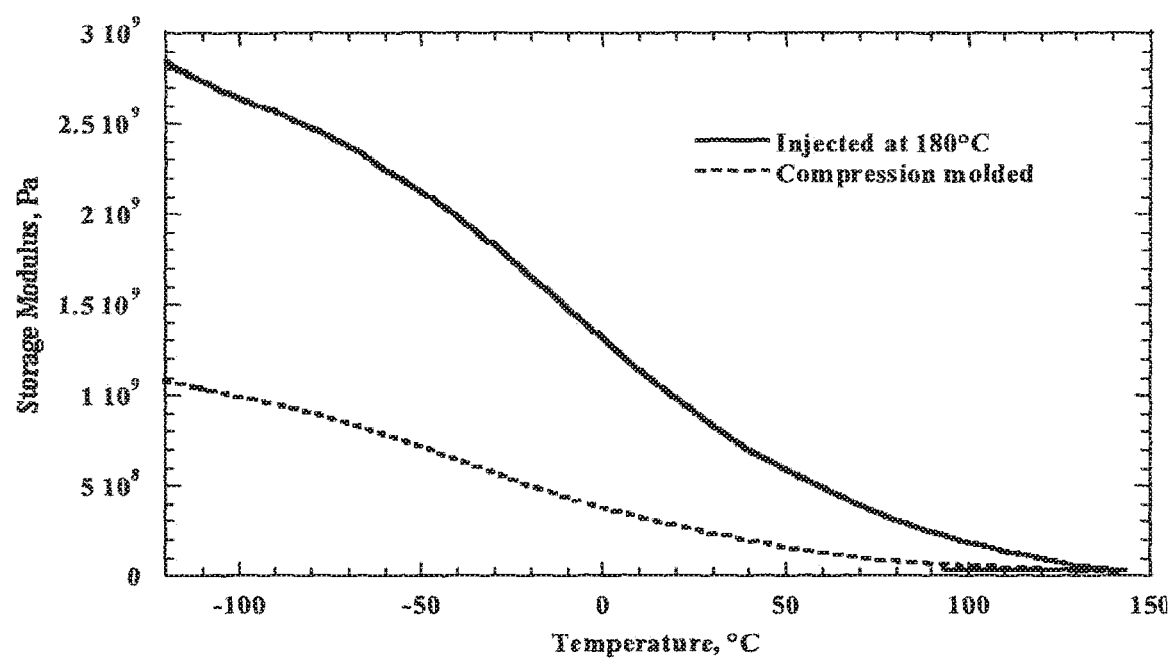
FIG. 5 shows the storage modulus of a thermoplastic composite material of an embodiment of the invention prepared by two methods: injection molding (continuous line), and compression molding (dashed line) according to the invention, determined by dynamic mechanical thermal analysis (DMTA)
Figure 6:
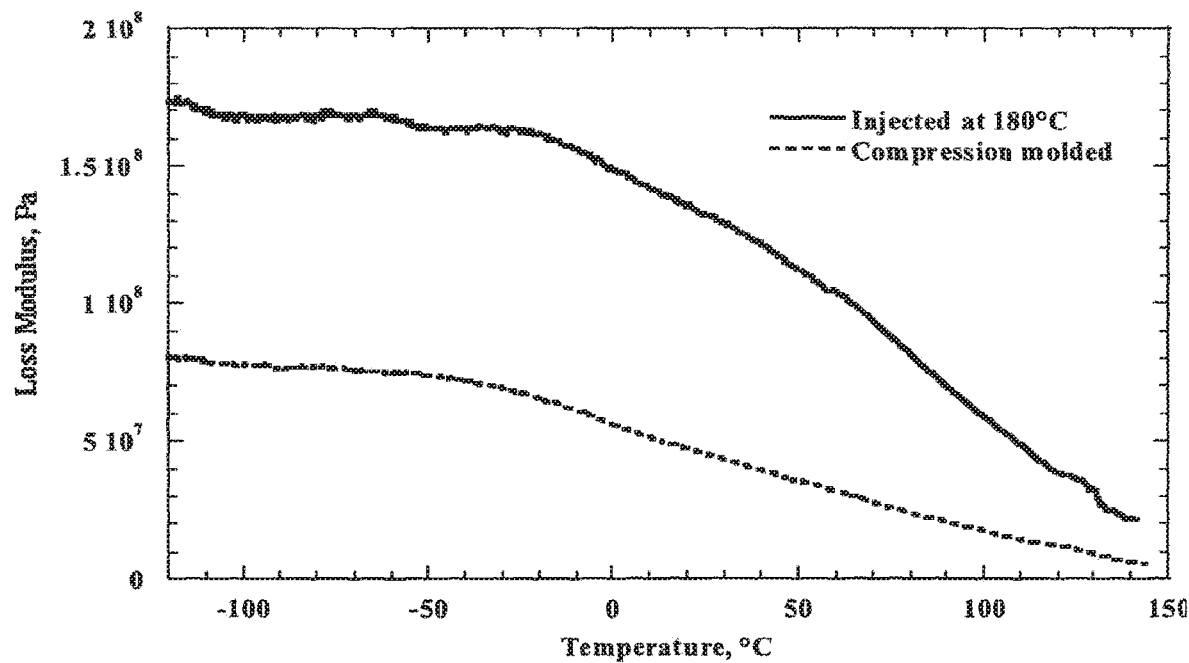
FIG. 6 shows the loss modulus of a composite material according to the invention prepared by injection molding (continuous line) compared to a compression molding (dashed line) as determined by DMTA.

FIGS. 5 and 6 show the storage modulus and loss modulus, respectively, of an injection molded test specimen (continuous line) and a compression molded test specimen (dashed line) as a function of temperature. The storage and loss modulus measure the stored energy during a cycle (representing the elastic portion), and the energy loss, dissipated as heat (representing the viscous portion).

4. Flexural Strength and Flexural Modulus

The flexural strength and flexural modulus of an injection molded test specimen were measured using a Universal Tensile Tester, Instron 5568 instrument and were found to be 21 MPa and 3,500 MPa, respectively.

5. Impact Resistance

Figure 7:
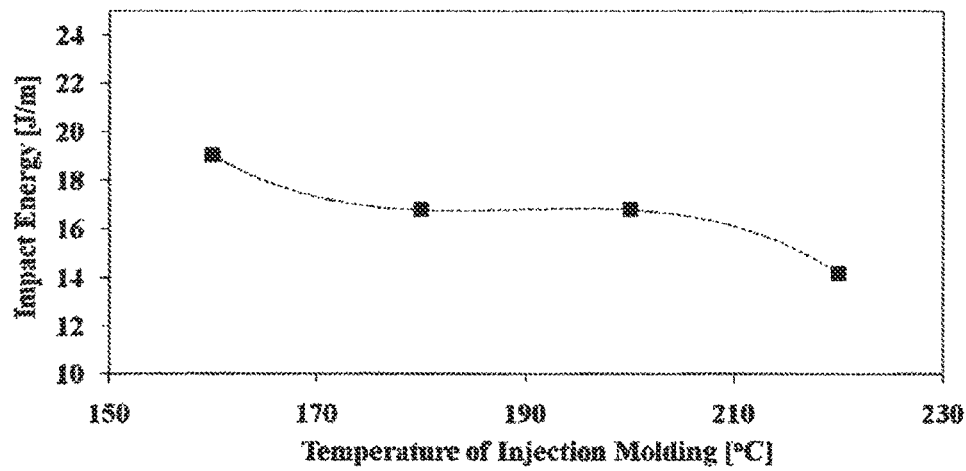
FIG. 7 shows the room temperature notched Izod impact energy as function of injection molding temperature ranging from about 160° C. to about 220° C., of a composite material according to an embodiment of the invention.

The impact strength (Notched Izod Impact) of the injection molded test specimen was measured using an Izod Impact Tester (Zwick). FIG. 7 shows the room temperature impact energy for various test specimens prepared by injection molding at temperatures between 160° C. and 220° C.

6. Rheology

Figure 8:
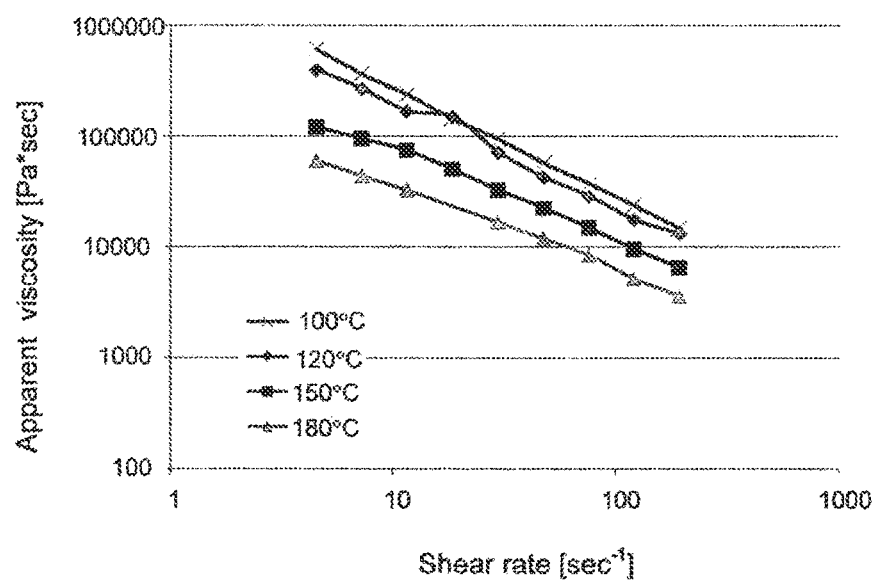
FIG. 8 is a graph showing the Capillary Rheometer viscosity of a composite material according to an embodiment of the invention, as a function of shear rate, tested at various temperatures.

The apparent melt viscosities of ground extrudate samples were determined using a Capillary Rheometer (Goettfert, Rheo-Tester #1000). The ground extrudate was fed into a temperature-controlled barrel at the temperature specified below, and forced through a capillary die (2 mm inner diameter×30 mm long). The steady force for a given extrusion rate was recorded. FIG. 8 provides the calculated apparent viscosity of the tested material as a function of shear rate, at 100° C., 120° C., 150° C. and 180° C. The behavior exhibited in FIG. 8 is typical of pseudoplastic thermoplastic materials, where the viscosity decreases upon increasing the shear rate.

7. Brabender Plastograph Test

Brabender Plastograph was used in order to determine the viscosity changes during the processing of fresh dried ground waste ("dried particulated waste", "DPW") at different temperatures. Accordingly, samples of dry waste were mixed in a Brabender mixing cell at different machine temperatures of 70° C., 100° C., 150° C., 210° C. and 240° C. and at a rotor speed of 80 rpm or at 70° C. or 100° C. with a rotor speed of 40 rpm for 30-60 minutes (until the torque reached a relatively steady state). The torque and the temperature of the material were recorded as a function of time throughout the process. It is noted that the torque correlates with changes in the viscosity of a material, which enables the variation in viscosity of the ground waste processed in the Brabender to be tracked throughput the process.

It is noted that below 70° C. and 80 rpm, rapid plastification of the blend was observed by a temperature build-up associated with the viscosity decline, this being similar to thermoplastic behavior. Interestingly, this occurred before other thermoplastic materials, such as PE, present in the blend, started to melt. Once PE melted, the viscosity of the blend increased. A viscosity decline was observed as the temperature continued to increase.

It is noted that when testing the DPW at 70° C. and at 40 rpm no "fusion" of the extrudate particulates was observed (not shown). After 60 minutes the blend appeared as pulverized solids, not generating any inter-particle adhesion. At the rotor rotational speed of 80 rpm good fusion of the extrudate was exhibited, wherein the material seemed to have reached a temperature of 141° C.

The tests also exhibited that the temperature of the blend reached a maximum, and then started to decline. During temperature decline, viscosity (evidenced by torque) declined as well. Without being bound by theory, this behavior may be explained by the partial hydrolysis of the waste material increasing the fluidity of the composite material.

Table 4 summarizes parameters measured during the testing using the Brabender.

TABLE 4

Torque as a function of temperature and rotor speed

| Material | Machine Temperature (° C.) | Rotor Speed (rpm) | Final Torque (Nm) | Final Material Temperature (° C.) | Test Time (min.) |
|---|---|---|---|---|---|
| PP[1] | 240 | 80 | 5.5 | nd | 24 |
| DPW | 70 | 40 | 25 | 91-96 | 60 |
| DPW | 70 | 80 | 28.1 | 141 | 30 |
| DPW | 100 | 80 | 35.3 | 148 | 40 |
| DPW | 150 | 80 | 30 (15)[2] | 174 (165)[2] | 49 (30)[2] |
| DPW[3] | 200 | 80 | 12 | 208 | 60 |
| Extrudate | 200 | 80 | 10 | 207 | 15 |
| DPW | 240 | 80 | 6.5 | 237 | 40 |

[1]Melt Flow Index of 2
[2]Test on a different sample taken from a different batch
DPW = dry particulated waste;
nd = not determined To summarize, Brabender tests that were performed on the dry particulated waste (DPW) show a reduction in the final torque as a function of the temperature of the Brabender, which is translated to reduction of viscosity with the increase of temperature. In all of the tests, the DPW exhibits a rapid fusion into processable flowable/soften blend similar to thermoplastic materials. These results are compatible with the behavior of thermoplastic materials.

Figure 9A:
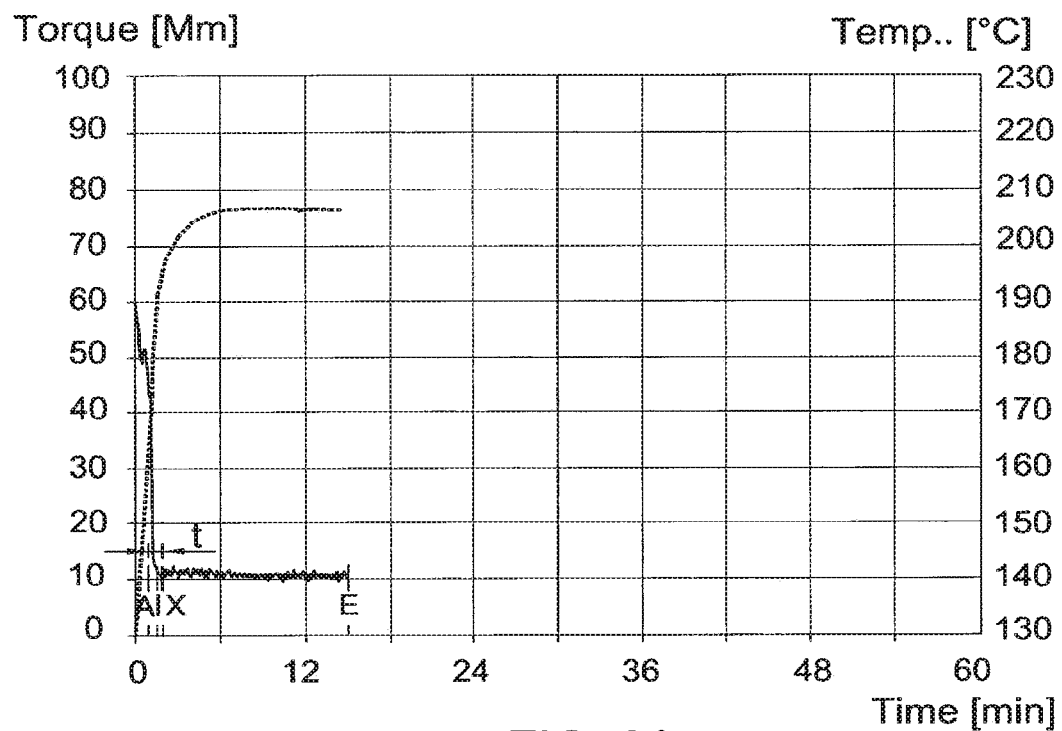
FIGS. 9A and 9B provide Brabender plastograph test results of (i) a composite material according to an embodiment of the invention (FIG. 9A at 200° C.) and (ii) polypropylene (PP) used as a reference (9B at 240° C.); using a rotor speed of 80 rpm.
Figure 9B:
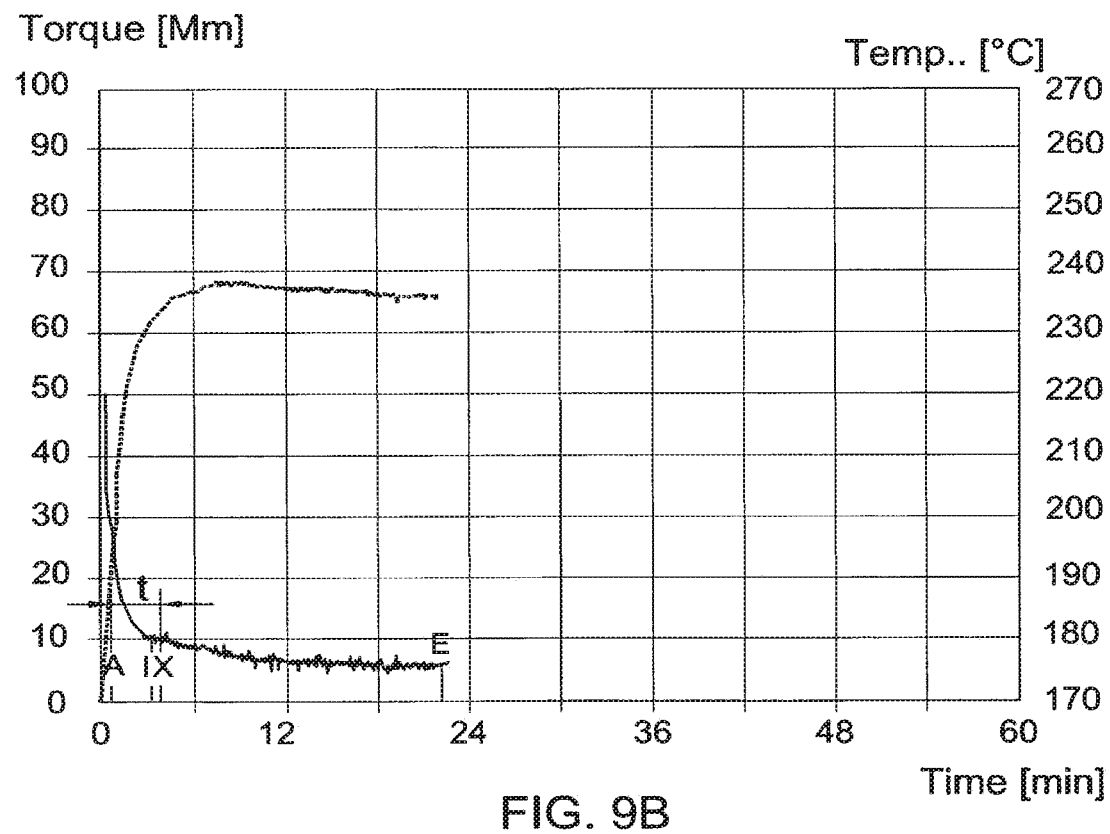

Brabender Plastograph was also used to demonstrate the thermoplastic behavior of the extrudate of the composite material. To this end, ground extrudate was mixed in a Brabender at 200° C., at a rotor speed of 80 rpm for 15 minutes (FIG. 9A). Respective parameters for Polypropylene (PP), used as reference are also presented (FIG. 9B, 240° C., 80 rpm). The Brabender plastograph of the extrudate and that of polypropylene are almost identical. Both exhibit a correlation between torque reduction and temperature elevation both of which reach a plateau after a very short blending period. Such similarity to the behavior of a "classic" thermoplastic material such as polypropylene provides further evidence for the thermoplastic character of the extrudate.

8. Microscopy

Figure 10A:
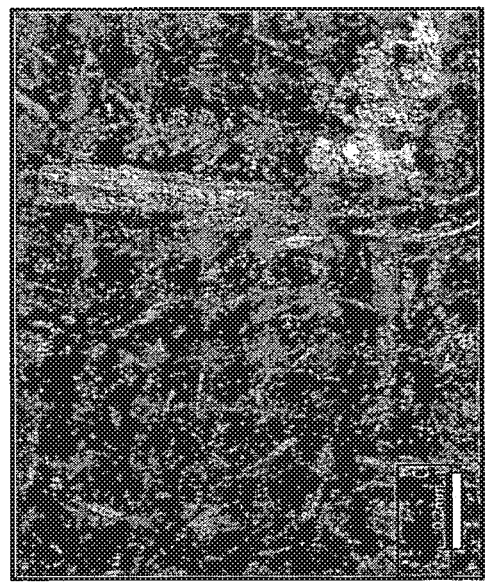
FIGS. 10A-10C are light microscope reflection micrographs at different magnifications (×50, FIG. 10A; ×100, FIG. 10B; and ×200, FIG. 10C) of the external surface of a solid composite material according to an embodiment of the invention.
Figure 10B:
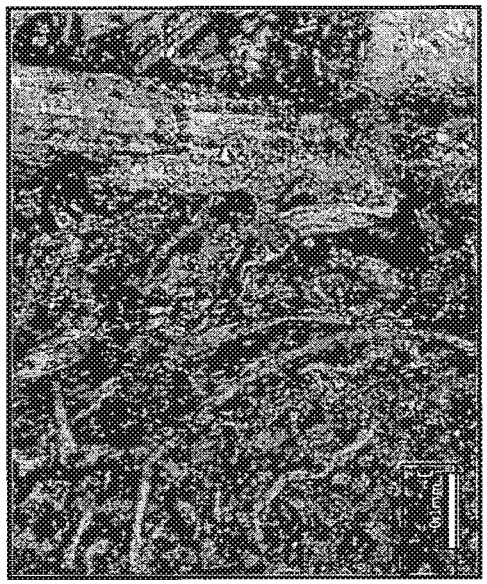
Figure 10C:

The outer surface of extrudates was examined under light microscopy, at three different magnifications (×50, ×100 and ×200). FIGS. 10A-10C provide three respective micrographs of the same area on the surface of an extrudate. The micrographs reveal continuity of the matter forming the extrudates, close contact between different substances in the extrudate and lack of apparent pores or gaps. Tightly embedded fibrous matter is seen stretching throughout the imaged surfaces.

Figure 11B:
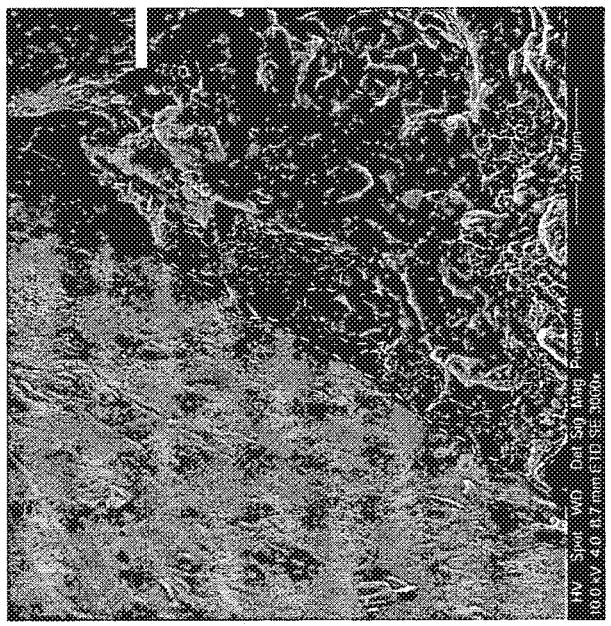
FIGS. 11A-11B are scanning electron micrographs (SEM) of cryogenic fracture surfaces of a composite material according to an embodiment of the invention.
Figure 11A:
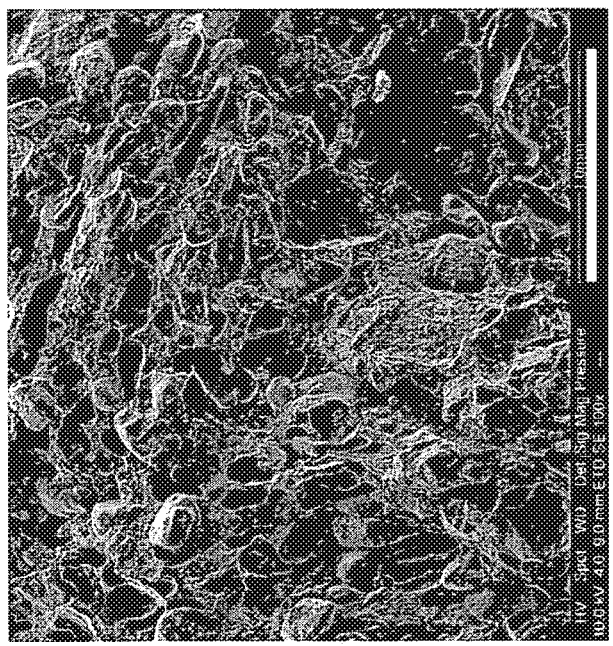

The inner structure of an extrudate material was studied by scanning electron microscopy (SEM). To this end, an extrudate was immersed in liquid nitrogen and fractured in the frozen state. Another sample obtained by compression molding of waste was treated similarly. SEM images of cross-sectional freeze-fractures of the extrudate and the compression molded samples are provided, respectively in FIGS. 11A-11B. In FIG. 11B the formation of regions of different formations are clearly exhibited. The boundaries between three such regions, or domains, are marked by respective three dashed lines, line A, line B and line C. The fact that there are no gaps or cavities along the boundaries is evidence for the close interaction between the different components. FIG. 11A shows that the extrudate is a multi-component composite material containing relatively large inclusions of irregularly shaped particles, 200-250 μm, and fibrous inclusions, 50-100 μm diameter, the particles and fibrous inclusions being dispersed in a continuous medium. This medium appears also to be a multi-component system comprising a plurality of particles of different shapes and sizes, down to 0.5-2 μm. The image also suggests that all components strongly interact one with the other, forming a dense compacted matter, with no visual gaps between the components.

It is noted that unless otherwise stated, the above experiments were not conducted according to ASTM.

9. Head Space Gas-Chromatograph Mass-Spectroscopy (HS-GCMS)

In order to characterize the unique volatile profile of the composite material of the invention, a sample from ran extrudate of the composite material according to the invention (extrudate II, sample 1) was analyzed by HS-GCMS. The volatile profile of the extrudate of the composite material was compared to the volatile profile of organic waste and of plastic waste, which are the major components comprised in SUW which contribute volatiles. To this end samples from organic waste (sample 2) and plastic waste (sample 3) components that were separated out of SUW were also analyzed by HS-GCMS. Such a comparison provides a qualitative indication of the specific volatiles that are unique to the composite material that is the product of the described process.

The samples were ground into powder and placed in SPME GC-MS vials. The vials were heated to 80° C. for 25 min and underwent SPME GC-MS analysis on SGE BPX or TR-5MS columns. Helium was used as carrier gas and the temp gradient 50° C.-240° C. at 10° C./min.

TABLE 5

Volatile profiles of the composite material extrudate and components

| Fraction No. | Retention time (min) | Detected Compounds | Organic waste | Plastic waste | Polyethylene | Extrudate |
|---|---|---|---|---|---|---|
| 1 | 7.9 | Acetone | + | | | + |
| 2 | 8.93 | Hexane | | | + | |
| 3 | 9.55 | 2,3-Butanedione | + | | | + |
| 4 | 9.8 | Butanone | | | | + |
| 5 | 10.81 | Acetic acid | | | | + |
| 6 | 11.80 | Pentanal | + | + | | + |

TABLE 5-continued

Volatile profiles of the composite material extrudate and components

| Fraction No. | Retention time (min) | Detected Compounds | Organic waste | Plastic waste | Polyethylene | Extrudate |
|---|---|---|---|---|---|---|
| 7 | 12.95 | Dimethyldisulfide | + | | | |
| 8 | 13.0 | Octane | | | + | |
| 9 | 13.16 | Toluene | + | + | | + |
| 10 | 13.1-13.9 | Pentanol | + | | | |
| 11 | 13.92 | Hextanal | + | + | + | + |
| 12 | 14.33 | Butanoic acid | | | | + |
| 13 | 15.27 | Furfural | | | | + |
| 14 | 15.28 | Hexanol | + | + | | + |
| 15 | 15.91 | Heptanal | + | + | | + |
| 16. | 16.74 | 1-Decene | | | + | |
| 17 | 16.8 | Decane | | | + | |
| 18 | 17.16 | 2-Pentyl-furan | + | | | |
| 19 | 17.4-17.5 | Heptanol | + | | | |
| 20 | 17.76 | Octanal | + | + | | + |
| 21 | 17.83 | Benzaldehyde | + | | | |
| 22 | 18.02 | Limomene | + | + | + | |
| 23 | 18.5 | Undecane | | + | + | |
| 24 | 18.2 | 2-Ethyl-hexanol | | + | | + |
| 25 | 18.62 | Phenol | | | | + |
| 26 | 19.05 | Octenal | + | | | |
| 27 | 19.47 | Nonanal | + | + | + | + |
| 28 | 20.09 | Dodecane | | + | + | + |
| 29 | 21.06 | Decanal | + | | + | + |
| 30 | 21.58 | Tridecane | + | + | + | + |
| 31 | 22.541 | Carvone | + | | | + |
| 32 | 22.543 | Tetradecene | | | + | |
| 33 | 23.11 | Tetradecane | + | | + | + |
| 34 | 24.79 | Pentadecane | | | + | |
| 35 | 26.69 | Hexdecene | | | + | |
| 36 | 27.08 | 2,4-Di-tertbutylphenol | | | + | |

Fractions No. 2, 7, 10, 18, 19, 21, 26, 34, 35 and 36 are compounds that are released from one of the components of SUW that are not released from the extrudate. Fractions No. 4, 5, 12, 13 and 25, are compounds that are released only from the extrudate. The difference in this release profile, using one, two or any number out of these 15 compounds alone or in combination as a differentiating factor, may be used as one of the characteristics of the composite material of the invention.

Figure 12A:
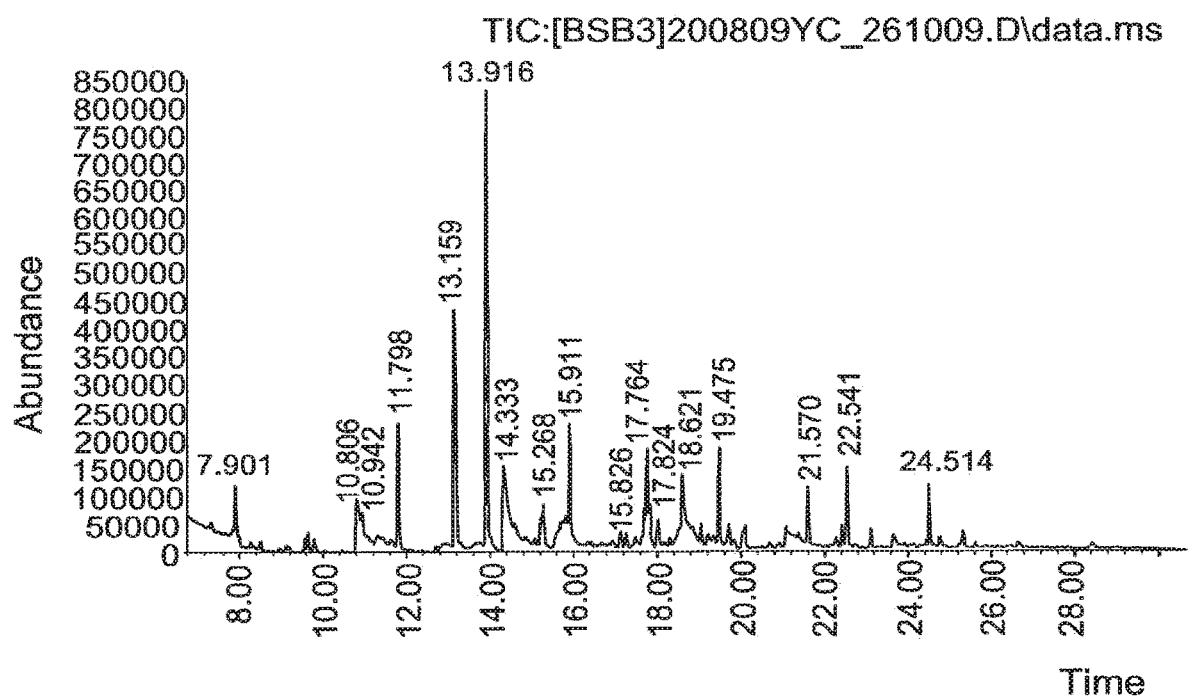
FIGS. 12A-12D are chromatograms of head space gas chromatography mass spectroscopy (HS-GCMS) of solid phase micro-extraction of a composite material according to an embodiment of the invention (FIG. 12A); unsorted organic waste (FIG. 12B); unsorted plastic waste (FIG. 12C) and polypropylene (FIG. 12D)
Figure 12B:
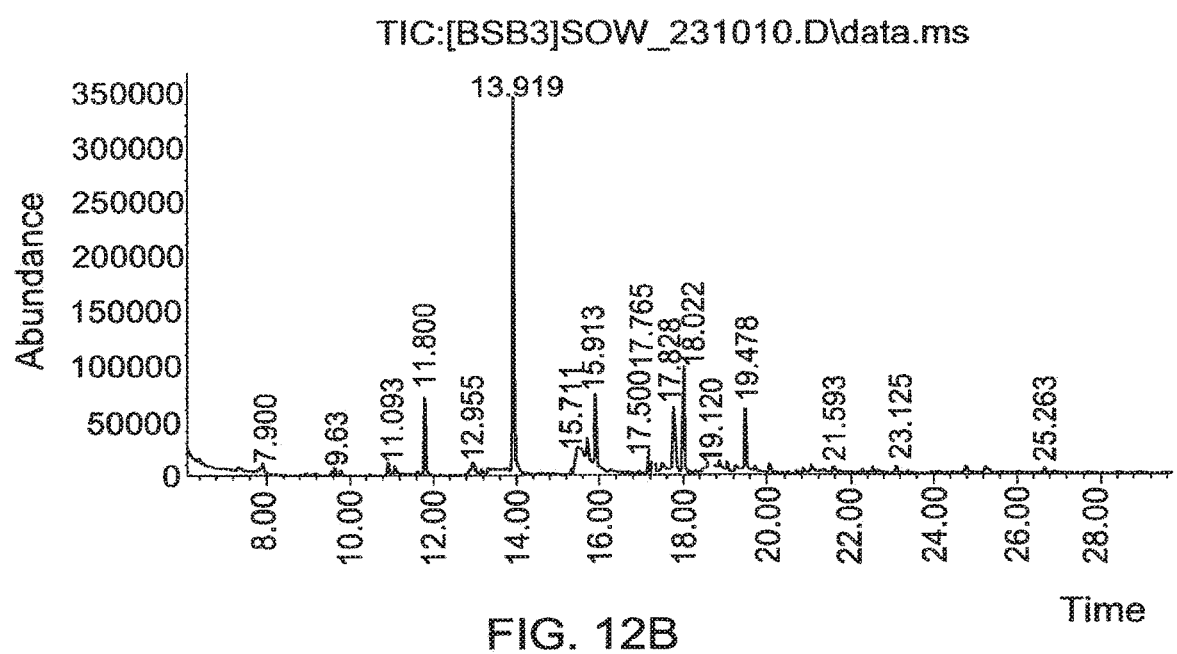
Figure 12C:
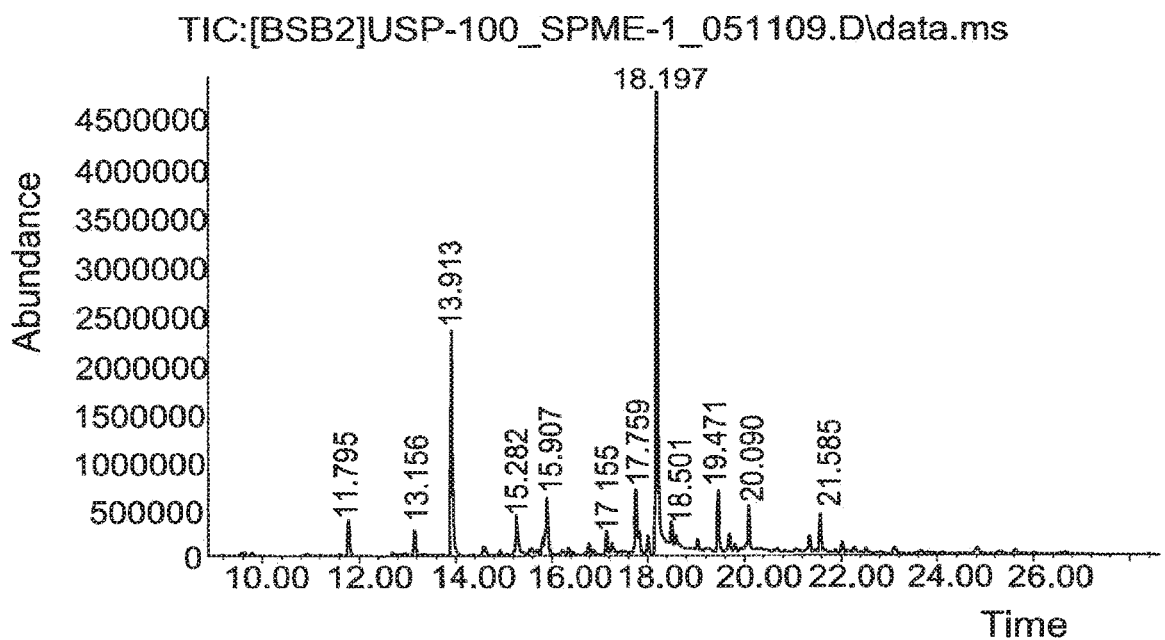
Figure 12D:
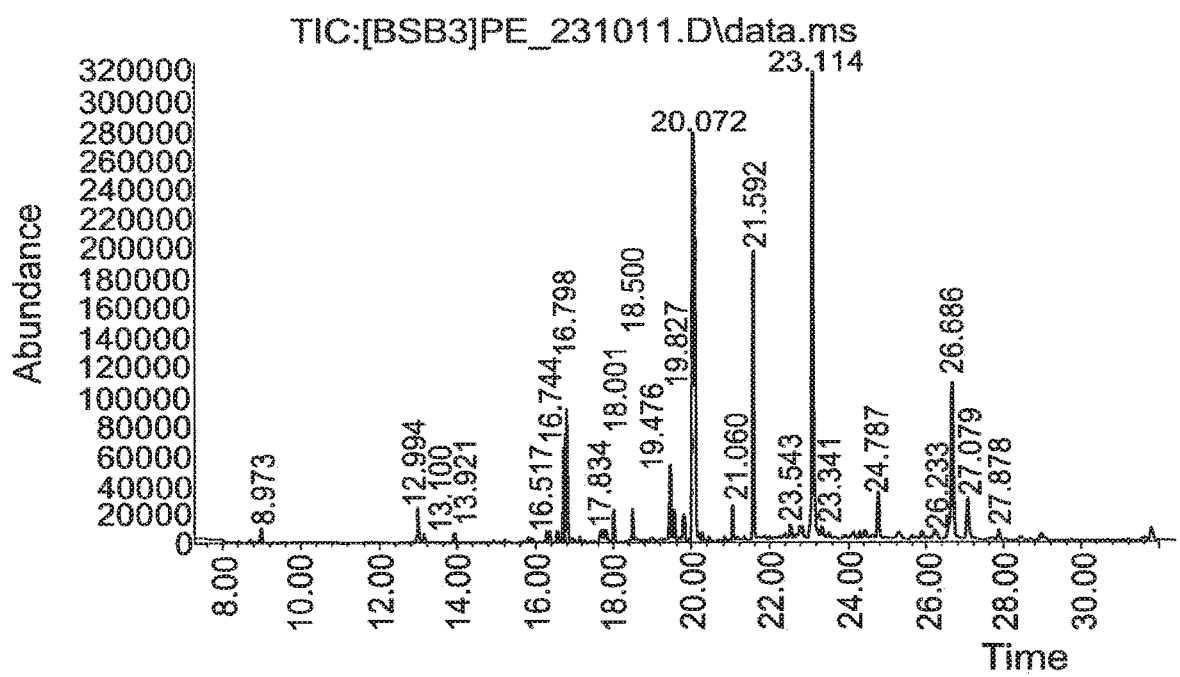

Reference is now made to FIGS. 12A-12D showing chromatograms of head space gas chromatography mass spectroscopy (HS-GCMS) of solid phase micro-extraction of an extrudate of the thermoplastic composite material according to the invention (FIG. 12A); organic waste (FIG. 12B); unsorted plastic waste (FIG. 12C) an polypropylene (FIG. 12D). Table 5 lists the compounds that were characterized by the MS of each GC fraction of each sample. As illustrated in FIGS. 12A-12D, and Table 5, significant differences are found between the samples. The most dominant peaks for the extrudate are: acetone, pentanal, toluene, hexanal (dominant peak), butanoic acid, furfural, heptanal, and octanal. These peaks correspond to degradation products of natural products (e.g. fatty acids).

Several typical volatiles of polyethylene, organic waste and plastic waste are absent from the volatile profile of the extrudate. For polyethylene, these are for example 1-decene, decane, dodecene, tridecene, tetradecene (the dominant peak), pentadecene and hexadecene. These are all long carbon chain volatiles originating from various oil products. Without being bound to theory this may indicate that in the processing of the SUW, these long chains are entrapped within the resultant product or that PE is protected from decomposition.

On the other hand, several compounds are part of the volatiles profile of the extrudate whereas they are not part of either the organic waste or the plastic waste profiles (dark background). These compounds are namely butanone, acetic acid, butanoic acid, furfural, and phenol. Their appearance in the volatile profile of the extrudate is a unique fingerprint of the product. Without being bound to theory, this may be indicative of a degradation reaction of cell wall and membrane compositions.

In addition, the volatile profile of the extrudate also contains various compounds which point to the components comprised in the SUW. For example, the noticeable element in the plastic fraction, 2-ethyl-hexanol, is a fatty alcohol with emulating properties known to be in use as plasticizer. It could not be found within the organic fraction of waste. On the other hand, acetone and 2,3-butanedione can only be found in the organic fraction of the waste material and they are indicative of the organic content within the extrudate. All together, these data are attributed to the unique odor profile of the composite material of the invention.

Example 3

Preparation of Extrudates Comprising Low or No Plastic Content

In order to find the plastic content threshold in SUW for making the composite material of the invention, extrudates that mainly contain organic waste were prepared. The extrudates were prepared according to the method described for preparation of extrudate II (prepared by using the home-made extruder) except for using 100% organic waste (OW) with only traces of plastic or a mixture of 90% OW and 10% recycled polyethylene instead of using dried particulate SUW. Both mixtures also contained traces of sand. The OW was obtained from a farmers market, wherein substantially all plastic and inorganic waste was manually removed therefrom.

One test sample of 100% OW extrudate was tested after it cooled down to room temperature and a second test sample was compressed by a force of 200 Kg in a compression mold. A sample of 100% unsorted polyethylene was also prepared for comparison.

The test samples of the OW/PE 90:10 and 0:100 were prepared by grinding the obtained extrudate, and feeding the ground extrudate into a Demag, Ergotech Viva 80-400 Injection molding Machine.

The test exhibited that all three mixtures comprising organic waste at different levels were processable and could be extruded. The 100% OW extrudate was susceptible to compression molding and when mixing with as low as 10% PE (OW/PE 90:10) the extrudate was susceptible to both compression molding and injection molding. Specimens from the test samples were analyzed according to the standard test listed in Table 6.

The mechanical properties of the injection molding test sample of OW/PE 90:10 and the comparison test sample of 100% PE are presented in Table 7.

TABLE 6

Standard procedures and equipment used for conducting the mechanical tests presented in Examples 3-8

| Test Description | Standard | Equipment |
| --- | --- | --- |
| Tensile Strength | ISO 521-1-2 | Testometric M350-10KN |
| Elongation at Break | ISO 521-1-2 | Testometric M350-10KN |
| Tensile Modulus | ISO 521-1-2 | Testometric M350-10KN |
| Flexural Strength | ISO 178 | Testometric M350-10KN |
| Flexural Modulus | ISO 178 | Testometric M350-10KN |
| Charpy Impact | ISO 179 | Ray-Ran |
| Density | ISO 1183-2 | Brabender-Densimat DM |
| Thermogravimetric Analysis | ISO 11358 | TGA Q500 TA |

TABLE 7

Mechanical properties of test samples made of mixtures of organic waste (OW) and polyethylene (PE)

| OW/PE (%:%) | TGA (%) | Charpy Impact (KJ/m$^2$) | Max. Tensile Strength (MPa) | Modulus of Elasticity (MPa) | Elongation at Break (%) | Flexural Strength (MPa) | Flexural Modulus (MPa) |
| --- | --- | --- | --- | --- | --- | --- | --- |
| 0:100 | 24 | N/A | 10.42 | 276.18 | 676.17 | 8.20 | 194.09 |
| 90:10 | 28 | 2.1 | 2.67 | 328.43 | 18.92 | 5.66 | 687.38 |

Example 4

Preparation and Properties of Extrudates Made of Mixtures of the Composite Material and Polyethylene Extrudate of the composite material which was prepared according to the procedure for preparing extrudate II as detailed above (using the home-made extruder) was particulated sieved and sorted according to the particle size to obtain composite material granules having a particle size of between 1.8 mm and 2.5 mm and composite material dust having a particle size of up to 0.7 mm. Particulated composite material granules or dust were mixed in a blender with various quantities of recycled polyethylene (PE). The combined composite material/PE mixture was introduced into a single screw extruder (dia. 70 mm) at 180° C., 50 rpm and a residence time of between 3-5 minutes. The resultant extrudate was ground, and fed into an injection machine (Demag, Ergotech Viva 80-400, temperature: 180° C., injection pressure: 60-90 bar, injection speed: 30-50 mm/s). The mechanical properties of each injection molding are presented in Table 8 and were determined according to the analysis standards and equipment listed in Table 6.

TABLE 8

Mechanical properties of injection moldings made of mixtures of the composite material extrudate (Extrudate) and recycled polyethylene (PE)

| PE/ Extrudate (%:% wt) | Charpy Impact (KJ/m$^2$) | Max. Tensile Strength (MPa) | Modulus of Elasticity (MPa) | Elongation at Break (%) | Flexural Strength (MPa) | Flexural Modulus (MPa) | Density (g/cm$^3$) |
| --- | --- | --- | --- | --- | --- | --- | --- |
| 100:0 | N/A | 10.42 | 276.18 | 676.17 | 8.20 | 194.09 | nd |
| 90:10 | N/A | 9.93 | 330.74 | 191.15 | 6.97 | 249.89 | nd |
| 80:20 | N/A | 9.83 | 328.50 | 122.02 | 10.10 | 308.93 | nd |

TABLE 8-continued

Mechanical properties of injection moldings made of mixtures of the composite material extrudate (Extrudate) and recycled polyethylene (PE)

| PE/Extrudate (%:% wt) | Charpy Impact (KJ/m$^2$) | Max. Tensile Strength (MPa) | Modulus of Elasticity (MPa) | Elongation at Break (%) | Flexural Strength (MPa) | Flexural Modulus (MPa) | Density (g/cm$^3$) |
|---|---|---|---|---|---|---|---|
| 70:30 | N/A | 8.8 | 349.61 | 86.13 | 10.48 | 364.18 | nd |
| 60:40 | N/A | 8.67 | 437.68 | 65.93 | 10.11 | 394.47 | nd |
| 50:50 | N/A | 8.18 | 512.61 | 76.24 | 12.03 | 578.24 | nd |
| 40:60 | 16.03 | 7.90 | 627.01 | 44.36 | 13.32 | 796.67 | nd |
| 30:70 | 9.80 | 7.02 | 714.68 | 1.8 | 14.99 | 989.3 | nd |
| 20:80 | 5.09 | 7.13 | 794.13 | 2.27 | 12.66 | 1060.2 | nd |
| 10:90 | 3.32 | 6.53 | 979.6 | 2.22 | 8.75 | 831.0 | nd |
| 0:100[1] | 2.22 | 5.92 | 1160.0 | 0.63 | 13.32 | 1934.5 | 1.35 |
| 0:100[2] | 1.84 | 5.13 | 997.9 | 7.71 | 7.68 | 830.0 | 1.35 |
| 0:100[3] | 1.39 | 5.60 | 951.55 | 0.34 | 11.08 | 1121.4 | 1.47 |

[1]Made of composite material granules that were dried at 100° C. for 24 h before injection of the samples.
[2]Made of composite material granules that were injected as is (without further drying).
[3]Made of composite material dust.

The results show that mixing the composite material extrudate with recycled polyethylene results in injectable molded products having mechanical properties that most of them are linearly correlated (except for the elongation at break and flexural strength) with the ratio between the composite material and the recycled PE. The elongation at break significantly drops from 676.17% to 191.15% even when as little as 10% composite material is present in the mixture. In addition, the flexural strength seems to reach a maximum for a PE/Extrudate 30:70 mixture and a minimum for each of the components alone.

A dynamic (parallel plates) rheometer test at 200° C. was performed on each on of the samples and demonstrated an inverse correlation between the amount of PE and the viscosity of the test sample. Therefore, without being bound to theory it may be concluded that PE contributes to the viscosity of the composite material. The recorded rheological behavior shows clearly that the viscosity increased as the polyethylene ratio was decreased Example 5

Preparation and Properties of Injection Molding Samples Made from Dried Particulated SUW with Various Unsorted Plastic (USP) Content An extrudate was prepared according to the procedure for preparing extrudate II as detailed above (using the home-made extruder) except for using mixtures of dried particiÂpated SUW with unsorted plastic waste (USP) in varied ratios instead of dried particulated SUW. The USP was received from a plastic recycling plant. Mixtures comprising dried particulated SUW and USP in a weight to weight ratio of 100:0, 75:25, 50:50, 25:75 and 0:100 were blended in a mixer until a homogenized SUW/USP mixture was formed. The homogenized SUW/USP mixtures were introduced into the home made single screw extruder (dia. 70 mm) at 180° C., 50 rpm and a residence time of between 3-5 minutes. The resultant extrudate was ground, and fed into an injection molding machine (Demag, Ergotech Viva 80-400, temperaÂture: 180° C., injection pressure: 60-90 bar, injection speed: 30-50 mm/s) to obtain test samples. Specimens from each of the test samples were analyzed according to the standard procedures and equipment listed in Table 6. The Mechanical properties are summarized in Table 9.

TABLE 9

Mechanical properties of injection molded samples made of mixtures of dried particluated substantially unsorted waste (dried particulated SUW) and unsorted plastic wake (USP)

| SUW/USP [total plastic] (% wt) | TGA (%) | Charpy Impact (KJ/m$^2$) | Max. Tensile Strength (Mpa) | Modulus of Elasticity (MPa) | Elongation at Break (%) | Flexural Strength (MPa) | Flexural Modulus (MPa) | Density (g/cm3) |
|---|---|---|---|---|---|---|---|---|
| 100:0 [13] | 79 | 1.66 | 6.25 | 686.73 | 0.34 | 11.08 | 1121.4 | 1.39 |
| 80:20 [30]* | na | 2.18 | 5.96 | 1260.1 | 0.63 | 4.56 | 1277 | nd |
| 75:25 [35] | 69 | 1.57 | 7.28 | 1264.6 | 0.28 | 14.30 | 1448.8 | nd |
| 50:50 [57] | 63 | 2.12 | 6.02 | 1344.4 | 0.45 | 13.11 | 1658.8 | nd |
| 25:75 [78] | 80 | 2.82 | 7.03 | 1225.5 | 0.94 | 16.59 | 1854.2 | nd |
| 0:100 [100] | 84 | 3.03 | 10.00 | 1435.3 | 1.20 | 18.34 | 1777.1 | 1.24 | nd—not determined
*prepared from a different SUW batch

Example 6

Mechanical Properties as a Function of Residential Time

In order to assess the effect of the residential time of the dried particulated SUW in the extruder on the mechanical properties of the extrudate, the extrusion process was iterated several times, and the mechanical properties of each extrudate were determined. To this end, an extrudate that was prepared according to the procedure for preparing extrudate II (using the home-made extruder) was reintroduced several times consecutively to the singled screw extruder under the same conditions. Each extrudate was sampled and characterized according to the standard procedures listed in Table 6.

Table 10 summarizes the mechanical analyses of the test samples. It is clear from the results that several mechanical properties are improved by iterating the residence in the extruder. While the mechanical properties improvement is most substantial after the third iteration, in most parameters it became even-tempered between the third and the sixth iterations. The only parameter that continuously improves and that may benefit from even further iterations is the modulus of elasticity which increases from 2970 MPa after the first extrusion to 4875 MPa after the fifth iteration.

Unlike other existing polymers in which their mechanical properties degrade by such iterations, the injection molding of the composite material exhibited an improvement in its mechanical properties.

Example 7

Leaching Tests Performed on Compression Molding of the Composite Material

Leaching tests were performed on specimens taken from cold compression moldings of hot extrudate of the composite material. The tests were conducted in accordance with the EN 12457/2 compliance test for leaching of granular waste materials and sludge.

The analysis was focused on detection of metal ions that leached from the test samples including As, Ba, Cd, Cr, Cu, Hg, Mo, Ni, Pb, Sb, Se, and Zn. The only metal ion that was found to be present above the instrumental detection limit of 0.5 mg/Kg was zinc in a concentration of 1.34-1.91 mg/Kg.

Example 8

Mechanical Properties as a Function of Liquids in the SUW

The effect of moisture content in the raw SUW on the mechanical properties of the composite material was tested. To this end, three injection molded samples of the composite material (samples 1-3) originating from the same SUW were tested. Sample 1 was prepared from SUW that was air dried for three days, sample 2 was prepared from SUW without further drying, and sample 3 was prepared from the SUW after it has been stored for three days in a closed storage chamber. All three samples were prepared following the procedure described for extrudate II (using the Erema extruder).

The volatile liquids content of the each raw material was determined by the weight difference before and after drying a specimen that was taken from the raw material for 24 hours at 60° C./30 mmHg. The loss of weight is attributed to removal of volatile liquids that were present in the SUW, especially moisture. Samples 1-3 had a volatile liquid content of 1.81, 11.07 and 11.07%.

The mechanical properties of the three samples are presented in Table 12. All three samples also had a surface energy of between 46 and 47.7 dyne/cm (determined as described above). It is evident from the mechanical properties analysis that the volatile liquids content as well as the wet storage period has a remarkable influence on the mechanical properties of the product.

TABLE 10

Mechanical properties of iterative injection moldings made of the composite material

| Iteration No. | Charpy Impact (KJ/m$^2$) | Max. Tensile Strength (MPa) | Modulus of Elasticity (MPa) | Elongation at Break (%) | Flexural Strength (MPa) | Flexural Modulus (MPa) |
|---|---|---|---|---|---|---|
| 1 | 1.37 | 4.8 | 2970 | 0.22 | 10.7 | 3350 |
| 2 | 1.73 | 5.7 | 3533 | 0.27 | 14.7 | 4075 |
| 3 | 1.49 | 5.6 | 4418 | 0.18 | 15.6 | 4289 |
| 4 | 1.30 | 4.9 | 4661 | 0.14 | 15.7 | 4788 |
| 5 | 1.37 | 5.6 | 4875 | 0.15 | 15.4 | 4584 |

TABLE 11

Testing procedures and instrumentation used for the mechanical analysis of the iterative extrusion injection moldings

| Test Description | Standard | Equipment |
|---|---|---|
| Tensile Strength | ISO 521-1-2 | Instron universal Testing machine |
| Elongation at Break | ISO 521-1-2 | Instron universal Testing machine |
| Tensile Modulus | ISO 521-1-2 | Instron universal Testing machine |
| Flexural Strength | ISO 178 | Instron universal Testing machine |
| Flexural Modulus | ISO 178 | Instron universal Testing machine |
| Charpy Impact | ISO 179 | Ceast Impact Pendulum |

TABLE 12

Mechanical properties of injection molded samples of the composite material having different volatile liquids content

| Sample No.: | Volatile liquids content (%) | TGA (%) | Charpy Impact (KJ/cm²) | Max. Tensile Strength (MPa) | Modulus of Elasticity (MPa) | Elongation at Break (%) | Flexural Strength (MPa) | Surface energy (dync/cm) |
|---|---|---|---|---|---|---|---|---|
| 1 | 1.81 | 34 | 1.85 | 4.49 | 368.68 | 0.46 | 4.03 | 46-47.7 |
| 2 | 11.07 | 32 | 0.71 | 4.96 | 702 | 0.61 | 7.94 | 46-47.7 |
| 3 | 11.07 | 18 | 1.72 | 4.00 | 702.3 | 0.42 | 2.55 | 46-47.7 |

Example 9

Analysis of Food Remains Content

Food analysis was performed on an SUW sample and on an extrudate prepared from the same SUW following to the preparation procedure provided for extrudate II. The analysis was performed according to the food analysis guidelines provided by the Association of Analytical Communities. The results are summarized in Table 13.

TABLE 13

Mechanical properties of injection molded samples of the composite material having different volatile liquids content

| Tested parameter | Result for raw material (%) | Result for Yuvalite (%) |
|---|---|---|
| Carbohydrates | 63.9 | 51.0 |
| Protein | 2.9 | 2.2 |
| lipids | 1.5 | 1.4 |
| Starch | <0.05 | <0.05 |
| Soluble fibers | 0.2 | 0.1 |
| Soluble sugars | <0.05 | <0.05 |

Example 10

Designed Articles

Figure 13A:
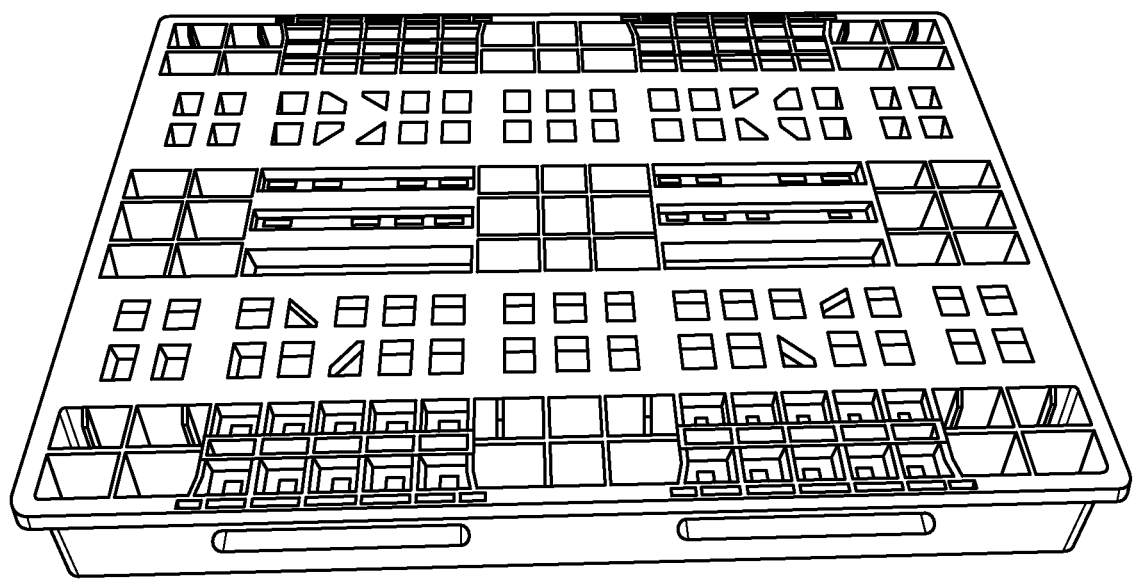
Figure 13B:
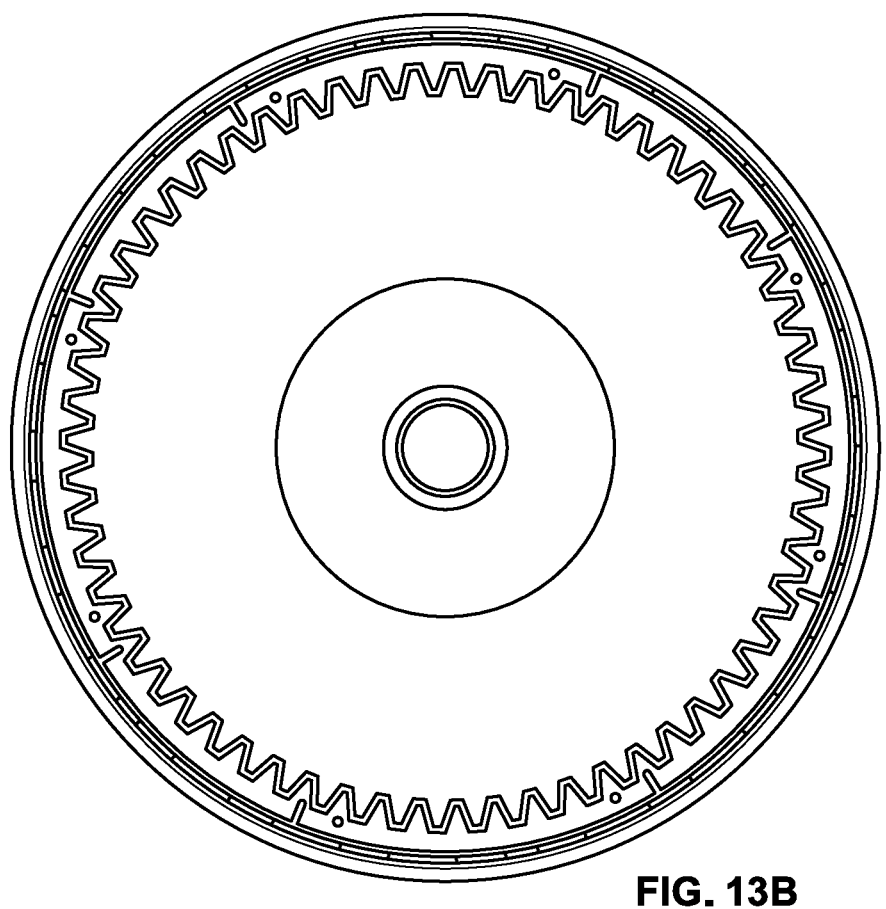
Figure 13C:
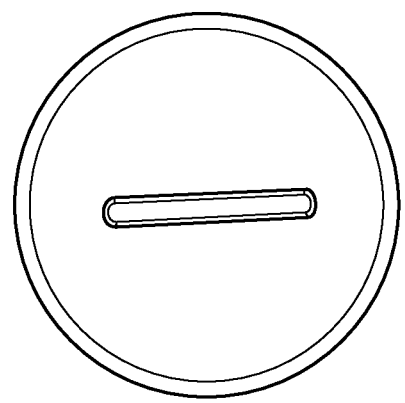
Figure 13D:
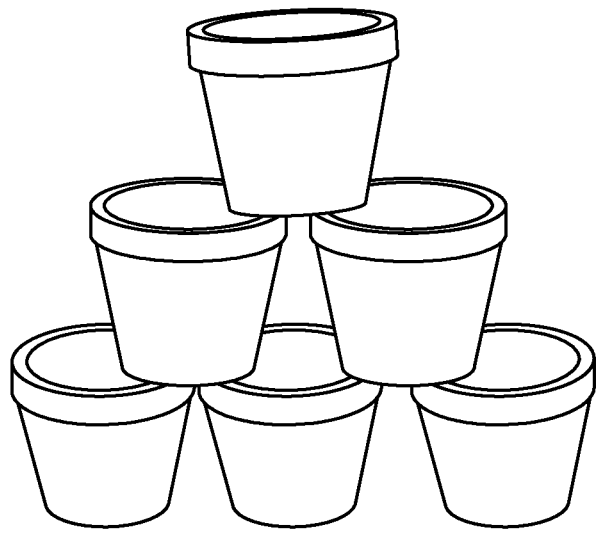
Figure 13E:
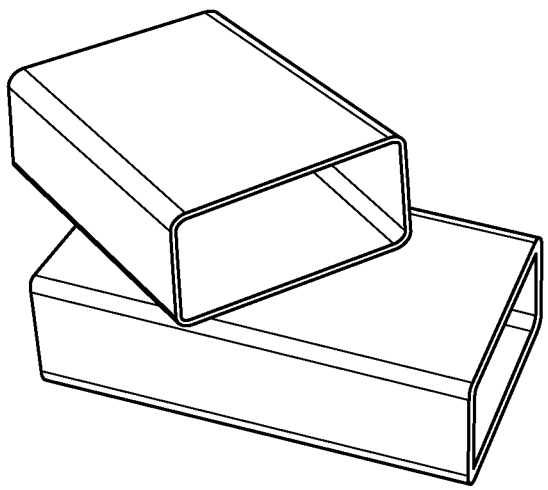

Reference is now made to FIG. 13A-13E providing pictures of various shaped articles which were made by using the composite material of the invention. The composite material was prepared by making an extrudate following the procedure that was described for extrudate II using the Erema extruder and an extrusion temperature of 190° C. The extrudate was granulated and sieved to obtain granules having a maximal size of 0.7 mm. The granules were reintroduced to the home made extruder at a working temperature of 160-170° C. The new extrudate was granulated and sieved to obtain granules having sizes as customary in the plastic industry. The resultant composite material granules were used plainly or mixed with various materials to produce articles with a designed shape. For example:

1. FIG. 13A shows a top view of a 18 Kg Pallet designed for storage and moving by forklifts was prepared by injection, molding a mixture comprising a composite material granules/HDPE 2.5, 60:40 w/w %, on a 1700 ton locking force machine.
2. A tool box (not shown) was prepared by injection molding a composite material granules/copolymer of PP (high flow) 2.5, 50:50 w/w % mixture at 220° C., on an 800 ton locking force machine.
3. A shelf for installing in a cupboard (not shown) was prepared by injection molding of a composite material granules/homo PP/calcium carbonate concentrate 60:33:7 w/w % mixture at 215° C. on a 500 t locking force machine.
4. FIG. 13B shows a residential composter bottom part made of the composite material of the invention. The bottom of the composter as well as other parts that are not shown were produced by injection molding of a composite material granules/copolymer PP/carbon black concentrate 70:28:2 w/w % mixture, at 190° C.
5. Sewer opening cover (FIG. 13C) was produced by injection molding of 100% composite material granules at 210° C. on a 120 t machine.
6. Sewer manhole base (not shown) was made by rotational molding of a composite material granules/HDPE 2.5 60:40 w/w % mixture.
7. FIG. 13D shows flower pots that were made by cold compression molding of 100% composite material extrudate on a 250 ton press. The flower pots where painted using various types of paints such as plastic, water based and oil paints.
8. A tubular body (FIG. 13E) with rectangular cross-section that was made by extrusion at 200° C. of a composite material granules/copolymer PP (low flow) 50:50 w/w % mixture.

Example 11

Adhesion of Moldings Made of the Composite Material

The adhesion properties of the composite material of the invention were utilized for preparation of articles made from several moldings of the composite material that were adhered to each other using epoxy glue. Molded layers of the composite material were also adhered to other types of materials. The following is a non-limiting example:

A countertop comprising a base and a working surface on top of the base was prepared by adhering a plate made of the composite material serving as the base to a pseudo-marble stone sewing as the working surface using colored plaster as the adhesive. The molded plate was prepared by compression molding according to the procedure described in Example 10 (using 220 ton pressure)

Example 12

Pilot Plant Design

Figure 14:
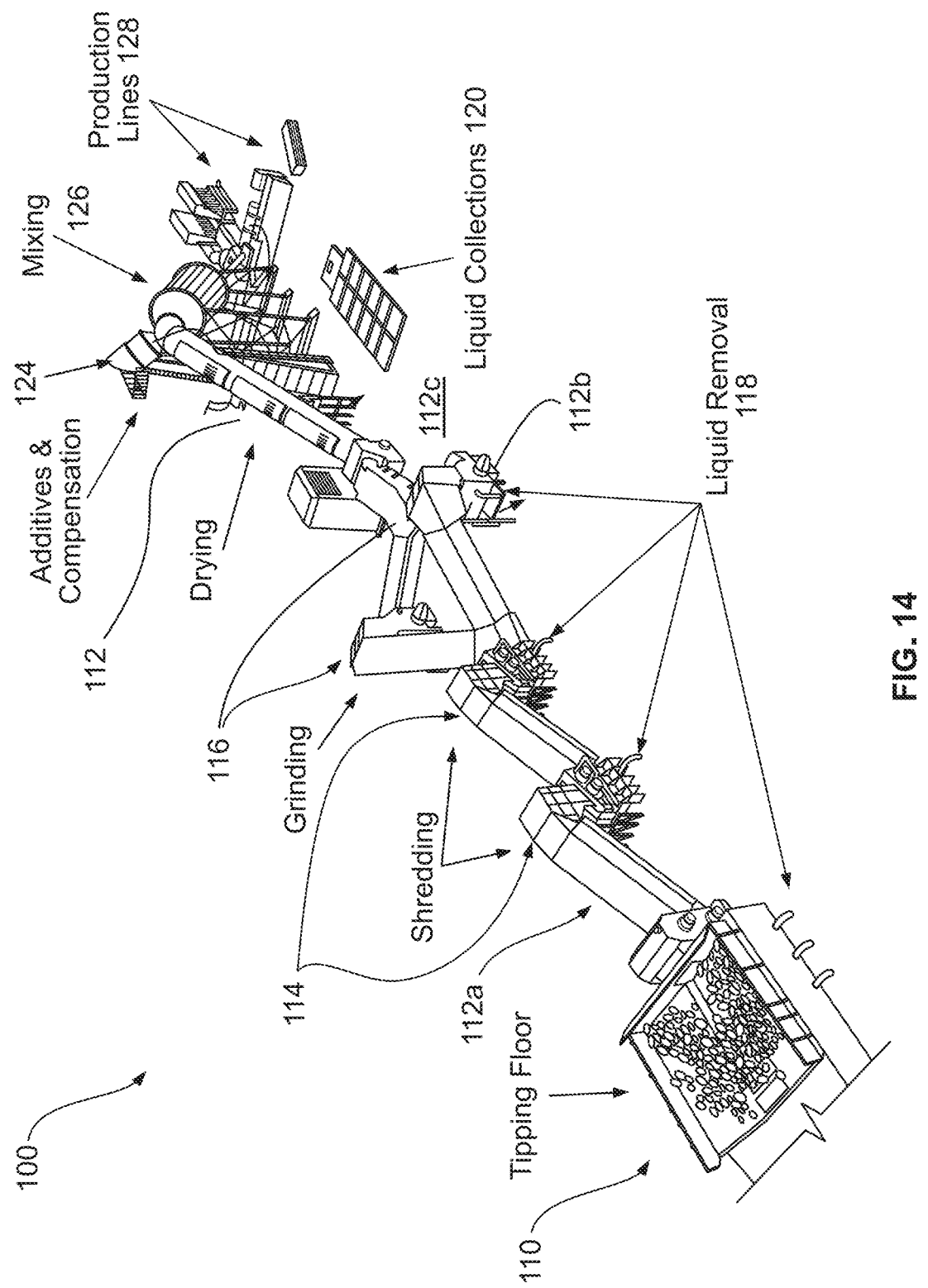
FIG. 14 is a schematic illustration of a system for treating SUW in accordance with one embodiment of the invention.

Reference is now made to FIG. 14 showing a schematic illustration of a system 100 for processing SUW according to one embodiment of the invention.

As shown, SUW is a priori collected in a tipping floor 110 from which the SUW is conveyed, via a dedicated feeding conveyer 112a to two sequential shredders 114, where the SUW is particulated into particles in the size range of centimeters, typically 8-10 cm. While the system includes according to this embodiment two sequential shredders, it may similarly comprise a single shredder as well as more than two shredders, ordered sequentially or in parallel. The shredders 114 may be any of those commercially available, such as the single shaft rotary shredder of Zerma (ZERMA Machinery & Recycling Technology (Shanghai) Co., Ltd.).

The shredded particles are then conveyed via a feeding conveyer 112b to two parallel granulators 116, to form particulate matter with a size of several to tens of millimeters, e.g. 2-20 mm. Two granulators are shown in parallel. The parallel setup of the granulators is needed to equalize the shredder outputs that are typically much higher than those of granulators.

It is noted that the shredded material does not necessary need to be further reduced in size and that the system may be similarly operated without the granulator. Further, while the present embodiment illustrates two granulators, positioned in parallel, the system may similarly be operated with a single granulator, as well as with more than two granulators, the granulators being in parallel or in sequence.

The size reduction of the waste may take place in two stages, the first before drying the waste, and the second after drying with a stream of hot air. During the size reducing stages (shredding and grinding), liquid expelled from the SUW is collected via a liquid removal subunit comprised of dedicated pipes 118, into a liquid collection unit 120. The liquid may be removed by pressing the matter.

The particulate matter exiting the granulator 116 (or the shredder 114, in case there is no granulator) is then conveyed via conveyer 112c into a drying unit 122. Conveyer 112c may be a magnet conveyer such as that manufactured by Zerma so as to remove metals (e.g. ferrous metals) from the particulated matter, prior to drying. The drying unit 122 may be a drum dryer as known in the art. The particulate matter is at least partially dried, but preferably not to completion (i.e. some amount of water needs to be retained in the particulate waste).

The partially dried particulate matter may then be supplemented with additives via a feeding tank 124 being connected to the upstream end of an extruder 126. Feeding of additives and other compensating substances depends on the desired characteristics of the product. For example, the dried particulated matter may be supplemented with wood chips.

Extruder 126 may be any extruder known in the art capable of mixing while heating the matter being mixed therein and expelled therefrom. In this particular embodiment, the extruder is a single screw extruder. The extruder 126 is set to heat the matter therein to a temperature between about 100° C.-240° C., and even between about 180° C.-230° C., whereby a flowable material is formed and extruded from the downstream end of the extruder through melt distributors into dedicated production lines 128 which may include a compression molding device (not shown), material spray device (not shown), granulating device etc. Heating is preferably, although not exclusively, accomplished by electrical hating provided by the extruder.

While the above describes one embodiment of a SUW treatment system for obtaining a thermoplastic like composite material according to the invention, it is to be understood that many changes may be made therein without departing from the spirit of the invention.

What is claimed is:

1. A plastic composition consisting essentially:
    1 weight percent to 50 weight percent of inorganic matter based on a total weight of the plastic composition,
    15 weight percent to 35 weight percent of plastic matter based on the total weight of the plastic composition, and
    a remainder of non-plastic organic matter;
    wherein the plastic composition is an extrudate;
    wherein the inorganic matter, the non-plastic organic matter and the plastic matter are homogeneously dispersed in a continuous medium of the plastic composition;
    wherein essentially all gaps between the non-plastic organic matter and the continuous medium, essentially all gaps between the plastic matter and the continuous medium, and essentially all gaps between the inorganic matter and the continuous medium are less than 0.1 micrometers in width;
    wherein the plastic composition:
        has a notched izod impact above 12 J/m and
        has a surface energy of at least 40 dyne/cm; and
    wherein a sample of the plastic composition that has been subjected to injection molding, has at least two of the following:
        tensile strength of above about 2.7 MPa,
        tensile modulus of above about 600 MPa,
        flexural modulus above about 690 MPa,
        flexural strength above about 5.6 MPa, and
        Charpy Impact above about 1.5 KJ/m$^2$.

2. The plastic composition of claim 1, wherein the non-plastic organic matter is present at 10 weight percent to 80 weight percent based on the total weight of the plastic composition.

3. The plastic composition of claim 2, wherein the non-plastic organic matter is present at 20 weight percent to 70 weight percent based on the total weight of the plastic composition.

4. The plastic composition of claim 1, wherein the inorganic matter is present at 5 weight percent to 40 weight percent based on the total weight of the plastic composition.

5. A plastic composition consisting essentially of:
    1 weight percent to 50 weight percent of inorganic matter based on a total weight of the plastic composition,
    15 weight percent to 35 weight percent of plastic matter based on the total weight of the plastic composition, and
    a remainder of non-plastic organic matter;
    wherein the plastic composition is an extrudate;
    wherein the non-plastic organic matter consists essentially of cellulose, hemicellulose, lignin, or any combination thereof;
    wherein the inorganic matter, the non-plastic organic matter and the plastic matter are homogeneously dispersed in a continuous medium of the plastic composition;
    wherein essentially all gaps between the non-plastic organic matter and the continuous medium, essentially all gaps between the plastic matter and the continuous medium, and essentially all gaps between the inorganic matter and the continuous medium are less than 0.1 micrometers in width;
    wherein the plastic composition:
        has a notched izod impact above 12 J/m and
        has a surface energy of at least 40 dyne/cm; and
    wherein a sample of the plastic composition that has been subjected to injection molding, has at least two of the following:
        tensile strength of above about 2.7 MPa,
        tensile modulus of above about 600 MPa,
        flexural modulus above about 690 MPa, flexural strength above about 5.6 MPa, and
Charpy Impact above about 1.5 KJ/m².

6. The plastic composition of claim 5, wherein the non-plastic organic matter is present at 10 weight percent to 80 weight percent based on the total weight of the plastic composition.

7. The plastic composition of claim 6, wherein the non-plastic organic matter is present at 20 weight percent to 70 weight percent based on the total weight of the plastic composition.

8. The plastic composition of claim 5, wherein the inorganic matter is present at 5 weight percent to 40 weight percent based on the total weight of the plastic composition.

* * * * *